(12) United States Patent
Kuramitsu et al.

(10) Patent No.: US 8,251,562 B2
(45) Date of Patent: Aug. 28, 2012

(54) UNITARY LIGHT GUIDE PLATE, LIGHT GUIDE PLATE UNIT, PLANAR LIGHTING DEVICE AND LIQUID CRYSTAL DISPLAY DEVICE

(75) Inventors: Masayuki Kuramitsu, Kanagawa (JP); Toshiaki Endo, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 778 days.

(21) Appl. No.: 12/374,633

(22) PCT Filed: Jul. 23, 2007

(86) PCT No.: PCT/JP2007/064444
§ 371 (c)(1),
(2), (4) Date: May 12, 2009

(87) PCT Pub. No.: WO2008/010593
PCT Pub. Date: Jan. 24, 2008

(65) Prior Publication Data
US 2010/0002169 A1 Jan. 7, 2010

(30) Foreign Application Priority Data

Jul. 21, 2006 (JP) ................................. 2006-199105
Jul. 21, 2006 (JP) ................................. 2006-199484

(51) Int. Cl.
*G02F 1/13357* (2006.01)
*F21V 8/00* (2006.01)
(52) U.S. Cl. ........ 362/616; 362/612; 362/613; 362/623; 362/624; 362/625; 349/65

(58) Field of Classification Search .................... 362/27, 362/607, 612, 613, 615, 616, 620, 623, 624, 362/625, 627, 628, 246; 349/65
See application file for complete search history.

(56) References Cited

U.S. PATENT DOCUMENTS
5,046,826 A * 9/1991 Iwamoto et al. ................ 349/65
(Continued)

FOREIGN PATENT DOCUMENTS
CN        1482497 A        3/2004
(Continued)

OTHER PUBLICATIONS

First Office Action, dated Jul. 2, 2010, issued in corresponding CN Application No. 200780027741.7, 38 pages in English and Chinese.

(Continued)

*Primary Examiner* — Stephen F Husar
*Assistant Examiner* — James Cranson, Jr.
(74) *Attorney, Agent, or Firm* — Sughrue Mion, PLLC

(57) ABSTRACT

A unitary light guide plate includes a light exit plane, a thick portion located substantially on a center portion of the light exit plane, thin end portions formed on both sides of the thick portion, a half portion of a parallel groove formed on a backside of the light exit plane to accommodate linearly arranged light sources, inclined back portions arranged so as to become thinner from the thick portion to the thin end portions, and scattering means for scattering light entering from the light sources accommodated in the parallel groove into the thin end portions and propagated through the inclined back portions toward the thick portion. A light guide plate unit has two or more of the unitary light guide plates coupled together in such a way that respective light exit planes are arranged to form a same plane.

39 Claims, 18 Drawing Sheets

U.S. PATENT DOCUMENTS

| | | | |
|---|---|---|---|
| 6,883,950 B2 * | 4/2005 | Adachi et al. | 362/555 |
| 7,488,104 B2 * | 2/2009 | Hamada et al. | 362/616 |
| 7,748,862 B2 * | 7/2010 | Kim | 362/97.2 |
| 7,784,986 B2 * | 8/2010 | Adachi et al. | 362/555 |
| 2002/0024803 A1 | 2/2002 | Adachi et al. | |
| 2004/0258382 A1 | 12/2004 | Iwasaki et al. | |
| 2005/0163422 A1 | 7/2005 | Iwasaki | |
| 2006/0061705 A1 | 3/2006 | Onishi | |

FOREIGN PATENT DOCUMENTS

| | | |
|---|---|---|
| CN | 1752820 A | 3/2006 |
| EP | 1 443 348 A2 | 8/2004 |
| JP | 10-82915 A | 3/1998 |
| JP | 3074747 B2 | 6/2000 |
| JP | 2000-250032 A | 9/2000 |
| JP | 2001-42327 A | 2/2001 |
| JP | 2002-42529 A | 2/2002 |
| JP | 2002-75036 A | 3/2002 |
| JP | 3427636 B2 | 5/2003 |
| JP | 2004-252441 A | 9/2004 |
| JP | 2004-319340 A | 11/2004 |
| JP | 2005-108676 A | 4/2005 |
| JP | 2006-66338 A | 3/2006 |
| JP | 2006-092768 A | 4/2006 |
| JP | 2006-294343 A | 10/2006 |
| WO | 2006/004160 A1 | 1/2006 |
| WO | 2007/020966 A1 | 2/2007 |

OTHER PUBLICATIONS

EP Communication, dated Mar. 11, 2011, issued in corresponding EP Application No. 07791176.6, 13 pages.

Written Opinion, issued Feb. 5, 2009, in corresponding International Application No. PCT/JP2007/064444, 6 pages.

Notification of Reasons for Refusal, dated Aug. 2, 2011, issued in corresponding JP Application No. 2006-199484, 7 pages in English and Japanese.

Notification of Reasons for Refusal, dated Aug. 2, 2011, issued in corresponding JP Application No. 2006-199105, 7 pages in English and Japanese.

Notification of Reasons for Refusal, dated Apr. 3, 2012, issued in corresponding JP Application No. 2006-199484, 7 pages in English and Japanese.

* cited by examiner

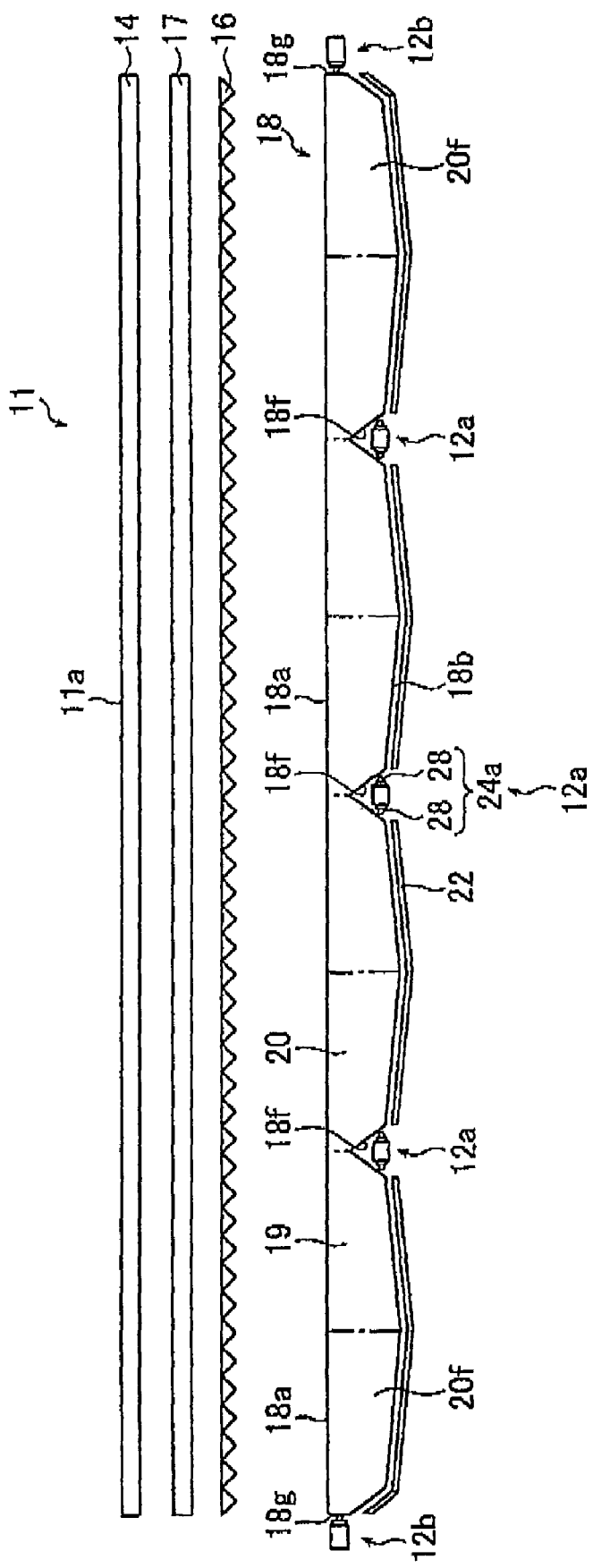

UNITARY LIGHT GUIDE PLATE, LIGHT GUIDE PLATE UNIT, PLANAR LIGHTING DEVICE AND LIQUID CRYSTAL DISPLAY DEVICE

TECHNICAL FIELD

The present invention relates to a unitary light guide plate which serves as a transparent light guide plate for diffusing light from a linear light source or a linearly arranged point-like light source in a plane direction to emit a more uniform illumination light from a light exit plane, a light guide plate unit, a planar lighting device using this, a unitary light guide plate for converting incident light from a point-like light source into planar outgoing light, and a planar lighting device and a liquid crystal display device using this.

BACKGROUND ART

Conventionally, for a liquid crystal display device, a backlight unit that emits light from a backside of a liquid crystal panel (LCD) to illuminate the liquid crystal panel has been used. The backlight unit is normally configured by using a light source for illumination, a light guide plate for diffusing light emitted from this light source to irradiate the liquid crystal panel with the light, and components such as a prism sheet and a diffusion sheet for uniformizing the light emitted from the light guide plate.

Recently, this backlight unit has been used not only for the liquid crystal display device in the above-mentioned manner but also for a planar lighting device which serves for indoor or outdoor illumination or illuminates a liquid crystal display panel, an advertisement panel, an advertisement tower or a billboard from the backside.

Regarding not only the planar lighting device but also the recent liquid crystal display device, there has been a demand for thinning and lower power consumption. To realize this, light guide plates of various shapes have been proposed (refer to Patent Document 1, Patent Document 2, and Patent Document 3).

Patent Document 1 discloses a light guide plate including a groove having a substantially rectangular section on a side opposite to a light exit plane, for arranging a bar-shaped light source, and a diffusion system formed on the plane opposite to the light exit plane and the groove to diffuse light from the light source.

Patent Document 2 discloses parallely-used light guide plates each configured by including a transparent substrate which has a pair of protruded edges jointed together to freely contact each other on opposing entrance end planes so that light exit planes can be wider than reflection planes on the opposing entrance end plane sides, thereby forming a fitting groove for fitting a linear light source between the entrance end planes in a bottom plane, light guiding means formed in the reflection plane of the transparent substrate, for modulating a density by setting a width-direction intermediate position between the opposing entrance end planes as a peak, and transmission adjusting means formed in the protruded edges of the light exit plane or into strip shapes in a light exit plane in-plane direction of the protruded edges, for reducing and adjusting transmission of light of light sources.

Patent Document 3 discloses a light guide plate including a top surface which is a flat plane and a bottom surface which is an inclined plane including a curve where a sectional shape is thinner as becoming farther from a light source, in which a relationship of $\theta f1 \leq \theta n1$ is satisfied, $\theta n1$ and $\theta f1$ respectively denoting inclined angles of the light guide plate bottom surface at a position relatively near the light source and a position far from the light source, and an inclined angle of the bottom surface at a thinnest position is 0°.

For the liquid crystal display device, a backlight unit (planar lighting device) that emits light from a backside of a liquid crystal display panel to illuminate the liquid crystal display panel has been used. The backlight unit is configured by using a light guide plate for diffusing light emitted from a light source for illumination to illuminate the liquid crystal display panel, and components such as a prism sheet and a diffusion sheet for uniformizing the light emitted from the light guide plate.

Currently, large liquid crystal televisions predominantly use a so-called direct type method which includes a light guide plate disposed immediately above the illumination light source. In this method, a plurality of cold cathode tubes serving as a light source are provided on a back surface of the liquid crystal display panel, and the inside of the backlight unit serves as white reflection surfaces to secure uniform light-amount distribution and necessary brightness.

In order to achieve an even light amount distribution with the backlight unit of the direct type, however, the liquid crystal display panel needs to have a thickness of about 30 mm in a direction perpendicular to the liquid crystal panel. The backlight unit is expected to become thinner in the future, but it is thought that, in the direct type, the realization of a backlight unit having a thickness of 10 mm or less will be difficult in terms of irregular light-amount.

A backlight unit that couples light emitted from a light source to a light guide plate and emits light from a top surface of the light guide plate to the outside has been proposed.

For example, Patent Document 4 describes a planar light source device configured by including a light source, a light guide plate having a single refractive index, and a reflection sheet disposed in a backside of the light guide plate. The light source is installed in a light-source-insertion conical concave portion disposed in the backside of the light guide plate. In the backside of the light guide plate, light scattering dots for scattering light in the light guide plate are disposed. At least a part of light from the light guide plate is reflected on a plane and/or the backside of the light guide plate, and then emitted from the entire plane of the light guide plate.

Patent Document 4 describes, as light guide plates used for the planar lighting device thus configured, a flat light guide plate and a light guide plate whose thickness becomes thinner from a center to a peripheral portion.

In such a planar light source device, the light source is installed in a light-source-insertion conical concave portion disposed in the backside of the light guide plate. Thus, it is described that the planar light source device can be thinned.

In such a planar light source device, light emitted forward from the light source enters the light guide plate while being refracted toward a side direction by the side surface of the light source insertion concave portion. Thus, it is described that the amount of light emitted forward from the light source into the light guide plate can be reduced, and brightness unevenness caused by high brightness of the light guide plate in front of the light source is prevented to enable realization of a uniform brightness distribution in the light exit plane of the light guide plate.

Patent Document 1: JP 3074747 B
Patent Document 2: JP 2001-42327 A
Patent Document 3: JP 2002-75036 A
Patent Document 4: JP 3427636 B

DISCLOSURE OF THE INVENTION

Problems to be Solved by the Invention

The use of the light guide plates described in Patent Documents 1 to 3 can provide a highly bright and uniform lighting device. However, for enlargement, the light guide plate itself has to be formed thick so as to enable light to reach a position farther from the light source. In other words, in the lighting devices using the light guide plates disclosed therein, there is a problem that thinning and weight-reducing are impossible.

In the shape having a tendency of being thinner as becoming farther from the entrance position of light from the light source or the flat plate shape described in each of Patent Documents 1 to 3, there is a limit on a reaching distance of light. In other words, there is a limit on enlargement of the lighting device using the light guide plate disclosed therein.

In the planar lighting device using the light guide plate described in Patent Document 4, to enable light from the light source to reach a farther position for the purpose of enlargement, the light guide plate itself has to be formed thick. In other words, there arises a problem that there is a limit even if the planar lighting device is made thin, disabling further thinning and weight-reducing.

In the flat light guide plate or light guide plate whose thickness becomes thinner from the center to the peripheral portion described in Patent Document 4, there is a limit on a reaching distance of light. Thus, there arises a problem that there is a limit on enlargement.

If enlargement is tried by using such a light guide plate, because of a limit on a light guide length, there arises a problem that sufficient in-plane uniformity of brightness in the light exit plane of the light guide plate cannot be achieved.

Therefore, objects of the present invention are to solve the above-mentioned problems with the conventional art, and to provide a unitary light guide plate, a light guide plate unit, a planar lighting device, and a liquid crystal display device which are thin and lightweight, and enable emission of a uniform illumination light with no brightness unevenness, and enlargement.

Means for Solving the Problems

In order to attain the above-described objects, a first embodiment of a first aspect of the present invention provides a unitary light guide plate, comprising: a rectangular flat light exit plane; a thick portion located substantially on a center portion of the light exit plane in parallel with one side of the light exit plane; thin end portions formed on both sides of the thick portion in parallel with the thick portion; a half portion of a parallel groove formed of at least one of the thin end portions and on a backside of the light exit plane to accommodate linearly arranged light sources; inclined back portions arranged on both sides of the thick portion so as to become thinner from the thick portion to the thin end portions in a direction orthogonal to the one side; and scattering means for scattering light entering from the light sources accommodated in the parallel groove into the thin end portions and propagated through the inclined back portions toward the thick portion.

And, in order to attain the above-described objects, the present invention provides a unitary light guide plate, comprising: a rectangular flat light exit plane; a thin portion located substantially on a center portion of the light exit plane in parallel with one side of the light exit plane; thick end portions formed on both sides of the thin portion in parallel with the thin portion; a parallel groove formed on a backside of the light exit plane of the thin portion in parallel with the one side to accommodate linearly arranged light sources; inclined back portions arranged on both sides of the thin portion so as to become thicker from the thin portion to the thick end portions in a direction orthogonal to the one side; and scattering means for scattering light entering from the light sources accommodated in the parallel groove into the thin portion and propagated through the inclined back portions toward the thick end portions.

In the present invention, preferably, the scattering means comprises scattering particles which satisfy Expressions (1) and (2) below:

$$1.1 \leq \Phi \cdot N_P \cdot L_G \cdot K_C \leq 8.2 \quad (1)$$

$$0.005 \leq K_C \leq 0.1 \quad (2)$$

where $\Phi$ represents a scattering cross section of the scattering particles, $N_P$ represents a density of the scattering particles contained in the unitary light guide plate, $L_G$ represents a length half of one side of the light exit plane in the direction orthogonal to the parallel groove, and $K_C$ represents a compensation coefficient.

In the present invention, preferably, surface roughness of the light exit plane satisfies Expression (3) below when $Ra_1$ represents surface roughness parallel to the parallel groove, and $Ra_2$ represents surface roughness in a direction perpendicular to the parallel groove:

$$Ra_2 < Ra_1 \text{ and } Ra_2 < 100 \quad (3)$$

And, in the present invention, preferably, an angle formed when a plane parallel to the light exit plane and an inclined plane of each of the inclined back portions cross each other at a vertex of the thick portion or each of the thick end portions satisfies Expression (4) below:

$$0° < \alpha < 45° \quad (4)$$

where $\alpha$ represents an angle formed when the plane parallel to the light exit plane and the inclined plane of each of the inclined back portions cross each other at the thick portion or each of the thick end portions).

In order to attain the above-described objects, a second embodiment of the first aspect of the present invention provides a light guide plate unit, comprising two or more of the unitary light guide plates described above, which are coupled together in such a way that respective light exit planes are arranged to form a same plane, wherein, in the two unitary light guide plates adjacent to each other, half portions of parallel grooves of thin end portions are coupled together in a direction orthogonal to at least the one side to form the parallel grooves for accommodating the linearly arranged light sources.

In the present invention, preferably, two or more sets of coupled bodies each of which comprises the two or more of the unitary guide plates coupled in the direction orthogonal to the one side are coupled together in a direction parallel to the parallel grooves so that the parallel grooves are arrayed on a same line.

In order to attain the above-described objects, the present invention provides a light guide plate unit, comprising: two or more of the unitary light guide plates described above, which are coupled together in such a way that respective light exit planes are arranged to form a same plane, wherein, the two unitary light guide plates adjacent to each other are coupled together in a direction orthogonal to parallel grooves by coupling thick end portions together, a direction parallel to the parallel grooves so that the parallel grooves are arrayed on a same line, or both of the direction parallel to the parallel grooves and the direction orthogonal to the parallel grooves.

In order to attain the above-described objects, the present invention provides a light guide plate unit, further comprising two half portions of a unitary light guide plate, each comprising: a rectangular flat light exit plane; a thin end portion on one end side of the light exit plane; a thick end portion on another end side thereof; an inclined back portion formed so as to become thicker from the thin end portion to the thick portion; and scattering means for scattering light entering from the light source into the thin end portion and propagated through the inclined back portion toward the thick end portion, wherein respective thick end portions of the two half portions of the unitary light guide plate are coupled to the thick end portions of both ends of the unitary light guide plate described above or uncoupled thick end portions of the unitary light guide plate, which are arranged at both ends in a direction orthogonal to the one side of the light guide plate unit described above in such a way that respective light exit planes are arranged to form a same plane.

In order to attain the above-described objects, a third embodiment of the first aspect of the present invention provides a planar lighting device, comprising: the light guide plate unit described above; and light sources linearly arranged in the parallel grooves, respectively, each being formed in coupled portion of the thin end portions of the unitary light guide plates of the light guide plate unit, which are adjacent to each other.

In the present invention, preferably, the light sources are also arranged linearly in the uncoupled thin end portions of the light guide plate unit, which are arranged in both ends in a direction orthogonal to the one side of the light guide plate unit.

In order to attain the above-described objects, the present invention provides a planar lighting device, comprising: the light guide plate unit described above; and light sources linearly arranged in the parallel groove of each unitary light guide plate of the light guide plate unit.

In the present invention, preferably, the light sources are also arranged linearly in the uncoupled thin end portions of the half portions of the unitary light guide plates when the half portions of the unitary light guide plates are coupled to both ends in a direction orthogonal to the one side in the light guide plate unit.

In addition, in the present invention, preferably, the light sources comprise linear light sources or point-like light sources linearly arranged at predetermined intervals.

In the present invention, preferably, a light exit distribution of the light sources disposed in the parallel groove is larger in a wall direction of both sides of the parallel groove than in a ceiling direction thereof.

In the present invention, preferably, a relationship between a maximum thickness of the unitary light guide plate in a direction perpendicular to the light exit plane and a distance between the light sources satisfies Expression (5) below:

$$10T < D_1 < 1000T \tag{5}$$

where T represents the maximum thickness of the unitary guide plate, and $D_1$ represents the distance between the light sources.

In the present invention, preferably, a distance between the linearly arranged light sources satisfies Expression (6) below:

$$10 \text{ mm} < D_2 \tag{6}$$

where $D_2$ represents the distance between the linearly arranged light sources.

In the present invention, it is preferable that the planar lighting device further comprises a reflection film disposed on a backside of an inclined plane of the inclined back portion of the light guide plate unit.

In the present invention, it is preferable that the planar lighting device further comprises a diffusion sheet disposed on the light exit plane of the light guide plate unit.

In the present invention, it is preferable that the planar lighting device further comprises a prism sheet disposed between the light exit plane and the diffusion sheet of the light guide plate unit.

Furthermore, in order to attain the above-described objects, a first embodiment of a second aspect of the present invention provides a unitary light guide plate made of a transparent resin for converting incident light from a point-like light source into planar exiting light, which has a plate-like shape, comprising: a light exit plane for emitting the planar exiting light to an outside thereof; a backside facing the light exit plane; a lateral plane connected to the light exit plane and the backside; a light entrance portion disposed substantially in a center portion of the backside and formed as a concave portion for disposing the point-like light source and causing the incident light from the point-like light source to enter to an inside thereof; and scattering means for scattering light entering from the light entrance portion to the inside thereof and emitting the light from the light exit plane to the outside thereof, wherein a thickness defined as a distance between the light exit plane and the backside becomes lager with an increasing distance from the light entrance portion.

In the first embodiment of the second aspect of the present invention, preferably, the scattering means comprises scattering particles contained in the unitary light guide plate, and satisfies Expressions (7) and (8) below:

$$1.1 \leq \Phi \cdot N_P \cdot L \cdot K_C \leq 8.2 \tag{7}$$

$$0.005 \leq K_C \leq 0.1 \tag{8}$$

where $\Phi$ represents a scattering cross section of the scattering particles, L represents a distance from the light entrance portion to a position in which a thickness of the unitary light guide plate is the maximum, $N_P$ represents a density of the scattering particles, and $K_C$ represents a compensation coefficient.

And, a second embodiment of the second aspect of the present invention provides a planar lighting device, comprising: a point-like light source; and the unitary light guide plate according to the first embodiment of the second aspect of the present invention.

In the second embodiment of the second aspect of the present invention, preferably, the unitary light guide plate satisfies Expression (9) below, when $D_1$ represents a thickness of the unitary light guide plate in an abyss of the concave portion of the light entrance portion, $D_2$ represents a thickness of the unitary light guide plate in a position in which the thickness of the unitary light guide plate is the maximum, and L represents a distance from the light entrance portion to the position in which the thickness of the unitary light guide plate is the maximum:

$$D_1 < D_2, \text{ and } 1/1{,}000 < (D_2 - D_1)/L < L/10 \tag{9}$$

It is preferable that the planar lighting device comprises two or more of the unitary light guide plates, and the lateral plane of the unitary light guide plate and the lateral plane of another unitary light guide plate are arranged adjacently to each other.

Preferably, the unitary light guide plate has a regular-polygonal plate-like shape and/or a circular plate-like shape.

Or, preferably, the unitary light guide plate has a hexagon plate-like shape.

Preferably, the unitary light guide plate includes the flat light exit plane and the backside inclined with respect to the light exit plane.

Or, preferably, the unitary light guide plate includes the flat backside, and the light exit plane inclined with respect to the backside.

Or, preferably, the unitary light guide plate has a shape in which the backside and the light exit plane are both inclined, and a thickness becomes larger with an increasing distance from the light entrance portion.

It is preferable that the planar lighting device further comprises a reflection film disposed to face the backside of the unitary light guide plate.

Preferably, the unitary light guide plate is formed by mixing at least a plasticizer in a transparent resin.

Preferably, the point-like light source comprises a white LED.

Or, preferably, the point-like light source is configured by using an RGB-LED including a red light emitting diode, a green light emitting diode, and a blue light emitting diode, and a plurality of lenses arranged correspondingly to light exist sides of the red light emitting diode, the green light emitting diode, and the blue light emitting diode. Further preferably, each of the plurality of lenses comprises a spherical transparent ball lens.

Preferable, the unitary light guide plate includes a plurality of diffusion reflectors in at least one of the light exit plane, the backside, and the lateral plane. And, preferably, the plurality of diffusion reflectors are arranged more densely with an increasing distance from the light entrance portion. Further, preferably, the plurality of diffusion reflectors are arranged on the backside.

And, a third embodiment of the second aspect of the present invention provides a liquid crystal display device, comprising: the planar lighting device according to the second embodiment of the second aspect of the present invention; a liquid crystal display panel disposed on a light exit plane side of the unitary light guide plate of the planar lighting device; and a drive unit for driving the liquid crystal display panel.

Effects of the Invention

According to the first and second embodiments of the first aspect of the present invention, the light guide plate is thin and lightweight, emission efficiency of light from the light exit plane with respect to light emitted from the light source can be increased, and a size of the light exit plane of the light guide plate can be set larger.

According to the third embodiment of the first aspect of the present invention, by using the unitary light guide plate of the first embodiment and the light guide plate unit of the second embodiment, the thin and lightweight planar lighting device can be manufactured at a lower cost, which enables an increase in emission efficiency of light emitted from the light exit plane with respect to light emitted from the light source, and setting of an illumination surface to a large size, or which can be applied to a liquid crystal display device such as a wall-mounted television.

According to the light guide plate and the planar lighting device of the first, second and third embodiments of the second aspect of the present invention, light entered from the light entrance plane can reach a farther position in the light guide plate. As a result, a uniform illumination light having no brightness unevenness can be emitted, and thinning, weight-reduction, and enlargement are enabled.

According to the liquid crystal display device of the third embodiment of the second aspect of the present invention, by installing the planar lighting device to obtain an illumination light of uniform brightness, good displaying can be carried out, and thinning, weight-reduction, and enlargement are enabled.

BRIEF DESCRIPTION OF THE DRAWINGS

FIG. 3 is a schematic sectional view of a lighting device main body which uses a light guide plate unit 18 of the present invention.

Figure 1:
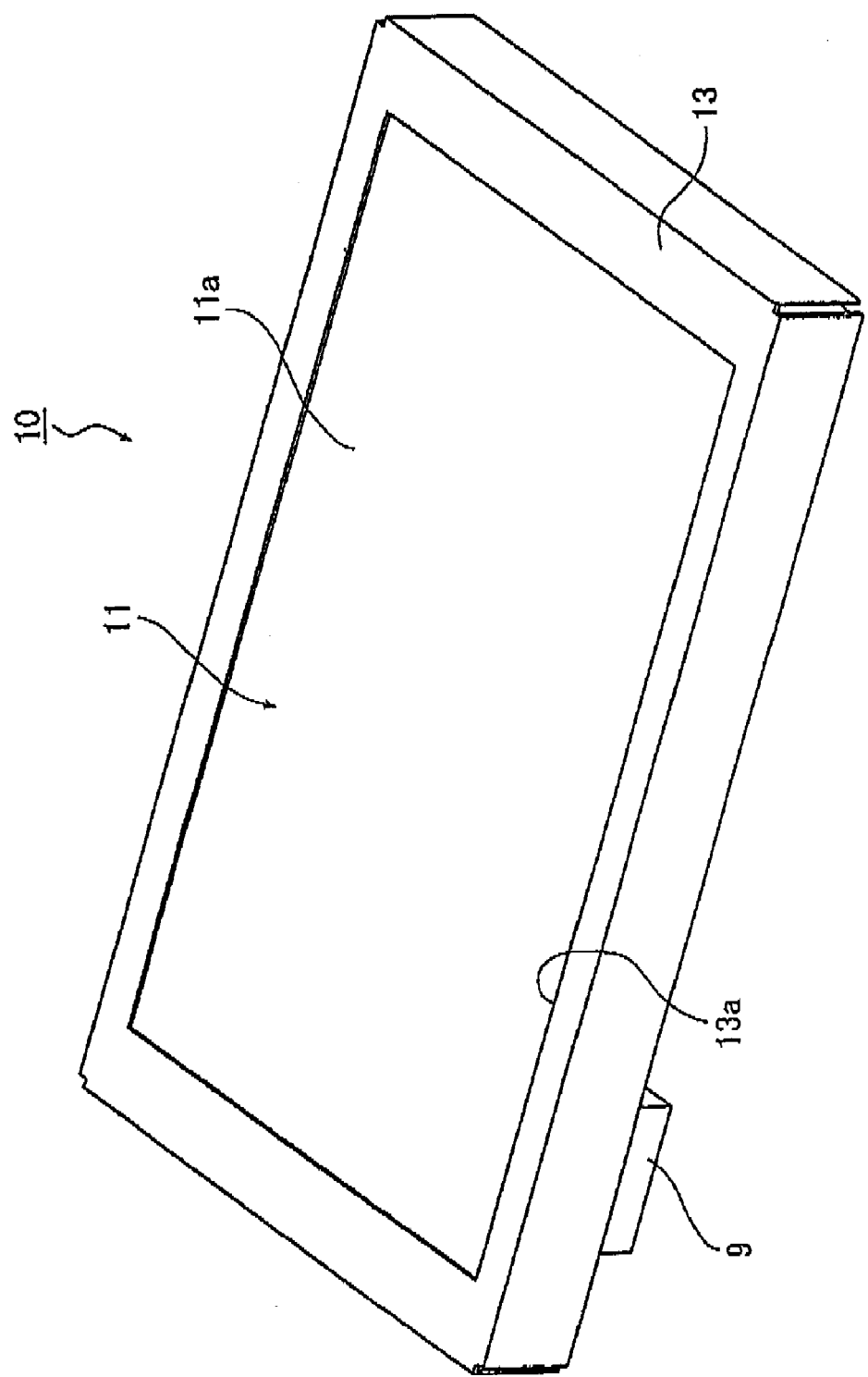
FIG. 1 is a schematic view of an embodiment of a planar lighting device of the present invention.
Figure 2A:
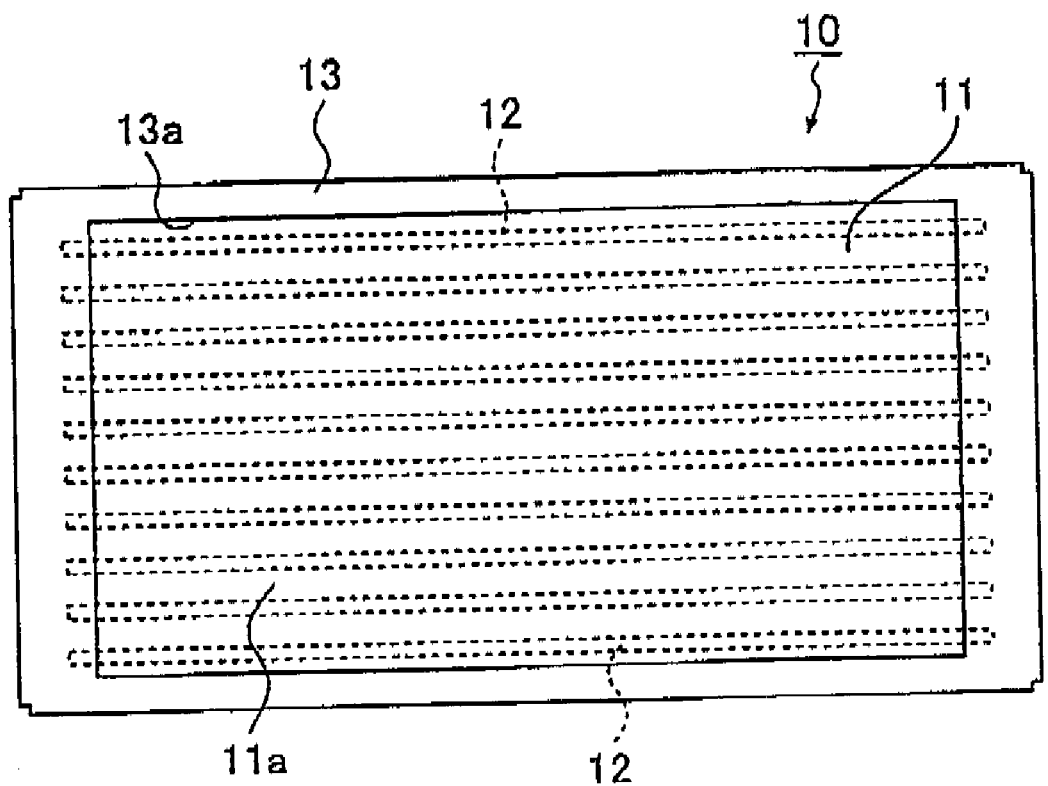
FIG. 2A is a front view of the planar lighting device of the present invention illustrated in FIG. 1.
Figure 2B:
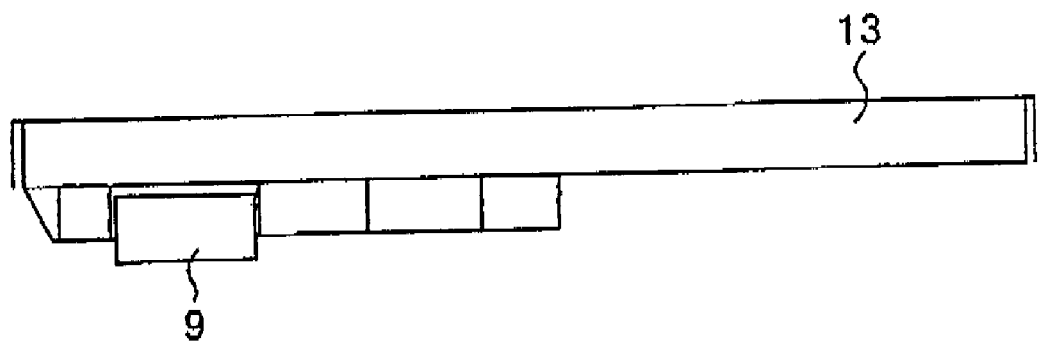
FIG. 2B is a bottom view of the planar lighting device of the present invention illustrated in FIG. 1.
Figure 2C:
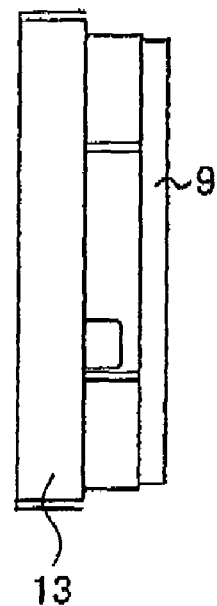
FIG. 2C is a lateral view of the planar lighting device of the present invention illustrated in FIG. 1.
Figure 2D:
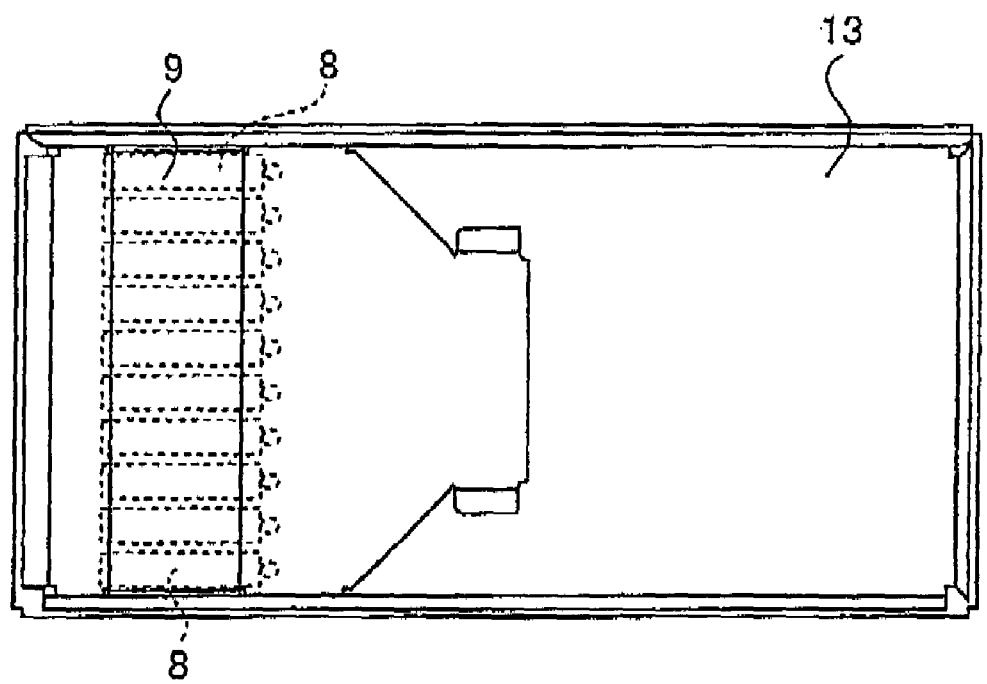
FIG. 2D is a rear view of the planar lighting device of the present invention illustrated in FIG. 1.

LEGEND 8 inverter unit
9 inverter accommodating unit
10 planar lighting device
11 lighting device main body
11a light exit plane
12 light source
13 housing
13a opening
14 diffusion sheet
16, 17 prism sheet
18 light guide plate unit
18a light exit plane
18b inclined plane
18f parallel groove
19, 20 unitary light guide plate
19a light exit plane
19b thick portion
19c thin end portion
19d half
19e inclined backside
20a light exit plane
20b thin portion
20c thick end portion
20d inclined backside
20f half portion of unitary light guide plate
24 LED array
25 LED chip
27 heat sink
28 coupling lens
30 low refractive-index member
32 light guide plate unit
34 unitary light guide plate
36, 41 light source
36a, 36b light exit plane
38a, 38b inclined plane
40a, 40b light entrance plane
42 backlight unit
44 liquid crystal display panel
46 drive unit
50 liquid crystal display device
52, 82 light source
54 diffusion film
56, 57 prism sheet
58, 70, 76, 80 light guide plate
58a light exit plane
58b backside
58c lateral plane
58d light entrance portion
58e light entrance plane
62 reflection sheet
64 LED chip
66 heat sink
72 diffusion reflector
74, 78 light guide plate complex
84 RGB-LED
86 R-LED
88 G-LED
90 B-LED
92 coupling lens
94, 96, 98 ball lens

BEST MODE FOR CARRYING OUT THE INVENTION

A unitary light guide plate, a light guide plate unit, and a planar lighting device using these according to the first aspect of the present invention are described below in detail based on preferred aspects illustrated in attached drawings.

FIG. 1 is a schematic perspective view illustrating the exterior of the planar lighting device according to the third embodiment of the present invention, which is a first aspect of the present invention, seen from a light exit plane side. FIGS. 2A, 2B, 2C and 2D are each a front view, a bottom view, a lateral view, and a rear view of the planar lighting device illustrated in FIG. 1. In the following drawings including these drawings, the planar lighting device is illustrated under magnification in a thickness direction thereof for ease of understanding.

As illustrated in FIG. 1 and FIGS. 2A to 2D, a planar lighting device 10 includes a lighting device main body 11 including a plurality of linear light sources 12 and emitting uniform light from a rectangular light exit plane 11a, a housing 13 accommodating the lighting device main body 11 therein and including a rectangular opening 13a on a side of the light exit plane 11a (surface side), an inverter accommodating portion 9 provided on a side of the housing 13 opposite to the light exit plane 11a (rear side) and accommodating a plurality of inverter units 8 each used to turn on the plurality of linear light sources 12, and a power supply (not shown) connected to the plurality of inverter units 8 accommodated in the inverter accommodating portion 9 and each turning on the plurality of linear light sources 12.

FIG. 3 is a schematic sectional view illustrating a lighting device main body 11 which uses a light guide plate unit 18 of the second embodiment of the first aspect of the present invention configured by coupling a plurality of unitary light guide plates 19 or 20 of the first embodiment of the first aspect of the present invention in parallel.

The lighting device main body 11 is for emitting uniform light from a rectangular light exit plane 11a, and basically configured, as illustrated in FIG. 3, so as to form a rectangular light exit plane 18a on the light exit plane 11a side by coupling a plurality of linear light sources 12 and a plurality of unitary light guide plates 19 or 20 of the first embodiment of the first aspect of the present invention in parallel, and includes a light guide plate unit 18 having a plurality of parallel grooves 18f formed on the backside of the light exit plane 18a to accommodate the linear light sources 12, two prism sheets 16 and 17 arranged on the light exit plane 18a side of the light guide plate unit 18, and a diffusion sheet 14.

Note that, as illustrated in FIG. 3, the lighting device main body 11 is constituted of the light guide plate unit 18 of the second embodiment of the first aspect of the present invention, and needless to say, the two prism sheets 16 and 17 and the diffusion sheet 14 arranged over the light guide plate unit 18 all have sizes (areas) substantially equal to that of the light exit plane 18a of the light guide plate unit 18.

The coupling of the unitary light guide plates 19 and 20 of the first embodiment of the first aspect of the present invention constituting the light guide plate unit 18 described above, and the coupling of the unitary light guide plates 19 or 20 for constituting the light guide plate unit 18 are described below in detail.

In FIG. 3, the linear light source 12 includes linear light sources 12a disposed in the parallel grooves 18f formed in the light guide plate unit 18 for emitting light from both sides toward the opposing wall planes of the parallel groove 18f, and linear light sources 12b disposed in both parallel end planes 18g of the light guide plate unit 18 to emit light from one side toward each parallel end plane 18g.

Figure 4A:
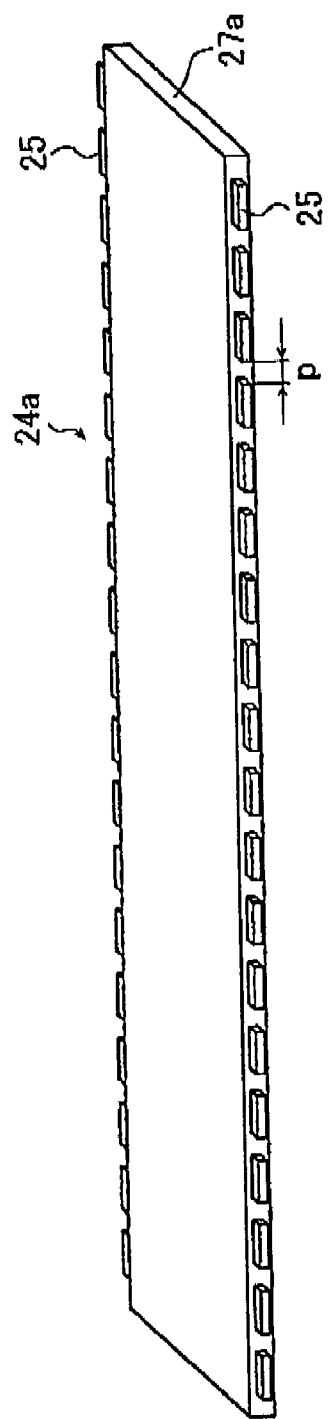
FIG. 4A is a schematic perspective view of a configuration of an LED array.

As illustrated in FIG. 3, the linear light source 12a includes an LED array 24a linearly extending in one direction (depth direction in the illustrated example), and a plurality of coupling lenses 28 arranged for a plurality of LED elements (refer to FIG. 4A) linearly arranged at predetermined intervals in both lateral planes of the extending direction of the LED array 24a. As illustrated in FIG. 4A, the LED array 24a includes a plate-like heat sink 27a extending in one direction, and a plurality of LED chips (LED elements) 25 arranged at predetermined intervals to face both lateral planes of the heat sink 27a.

Figure 4B:
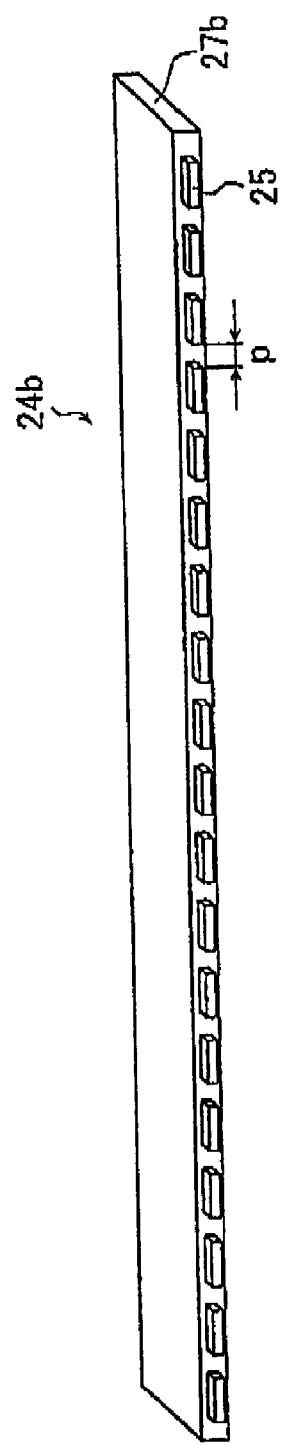
FIG. 4B is a schematic perspective view of a configuration of an LED array different from that of FIG. 4A.

As illustrated in FIGS. 3 and 4B, the linear light source 12b includes an LED array 24b (refer to FIG. 4B) including a substantially half-width plate-like heat sink 27b extending in one direction (deep direction in the illustrated example of FIG. 3) and a plurality of LED chips 25 arranged at predetermined intervals in one lateral plane of the heat sink 27b, and a plurality of coupling lenses 28 (refer to FIG. 3) arranged for the plurality of LED chips 25 of the LED array 24b. In other words, the LED array 24b illustrated in FIG. 4B has a shape where the LED array 24a of FIG. 4A is substantially halved in a longitudinal direction (extending direction), and the linear light source 12b has a shape substantially halved in the depth direction of the linear light source 12a as illustrated in FIG. 3.

As illustrated in FIGS. 4A and 4B, each of the heat sinks 27a and 27b supports the plurality of LED chips 25 in both lateral planes or one lateral plane of the longitudinal direction, and is preferably made of a highly heat conductive metal such as copper or aluminum so as to absorb heat generated from the plurality of LED chips 25 and to radiate the heat to the outside.

The plurality of LED chips 25 thus supported in each of the heat sinks 27a and 27b are linearly arranged, as illustrated in FIG. 3, so as to face the opposing wall planes of the parallel groove 18f of the light guide plate unit 18 and the parallel end planes of the light guide plate unit 18.

While this embodiment uses a heat sink as a support member for the LED chip, the present invention is not limited thereto: where the LED chip does not need to be cooled, a plate member without a heat-releasing function may be used as the support member.

Further, as the LED chip 25, a monochromatic LED configured to convert light emitted from the LED into white light by using a fluorescent substance is preferably used. For example, when a GaN blue LED is used as a monochromatic LED, white light can be obtained by using yttrium aluminum garnet (YAG) base fluorescent substance.

Figure 4C:
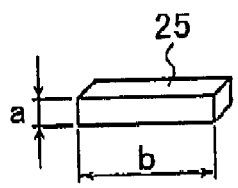
FIG. 4C is a schematic top view of a configuration of an LED chip.

As illustrated in FIG. 4C, the LED chip 25 according to this embodiment has a rectangular shape so that the sides perpendicular to the direction in which the LED chips 25 are arrayed are shorter than the sides lying in the direction in which the LED chips 25 are arrayed or, in other words, the sides lying in the direction of thickness of the light guide plate unit 18 (direction perpendicular to the light exit plane 18a) are the shorter sides. In other words, the LED chip 25 has a shape satisfying b>a where "a" represents the length of the sides perpendicular to the light exit plane 18a of the light guide plate unit 18 and "b" represents the length of the sides in the direction of the array. Further, let "p" be a distance by which the arrayed LED chips 25 are spaced apart from one another, then p>b holds. Thus, the relationship among the length "a" of the sides of the LED chips 25 perpendicular to the light exit plane 18a of the light guide plate unit 18, the length "b" of the sides in the direction of the array, and the distance "p" of the LED chips 25 by which the arrayed LED chips 25 are spaced apart from one another preferably satisfies p>b>a.

The LED chips 25 each given a rectangular shape allows the thickness of the light source to be reduced while maintaining output of a great amount of light. A thinner light source enables a thinner design of the planar lighting device 10 according to the present invention.

It should be noted that the LED chips each preferably have a rectangular shape with the shorter sides lying in the direction of thickness of the light guide plate unit 18 to achieve a thinner design of the LED array, but the present invention is not limited thereto, allowing use of LED chips having various shapes such as a square, a circle, a polygon, and an ellipse.

As illustrated in FIG. 3, ball lenses are provided as coupling lenses 28 on the light exit side of the respective LED chips 25 of the LED arrays 24a and 24b. As described above, the coupling lenses 28 are disposed correspondingly to the respective LED chips 25. Light emitted by the individual LED chip 25 is collimated by the coupling lenses 28 before entering an inner surface of the light guide plate unit 18.

While ball lenses are used as coupling lenses here, no specific limitations are placed on the coupling lenses, provided that they are capable of collimating light emitted by the LEDs. As the coupling lenses, for example, a cylindrical lens, a lenticular lens, a half-cylindrical lens, a Fresnel lens can also be used.

An LD (laser diode) can also be preferably used.

The light guide plate unit 18 of the second embodiment of the first aspect of the present invention can be configured by, as described above, in FIG. 3, coupling a plurality of unitary light guide plates 19 obtained by dividing the light guide plate unit 18 by dotted lines (refer to FIGS. 5A and 5B) in parallel in a direction orthogonal to the parallel grooves 18f so that light exit planes 19a thereof can be coupled as a flat plane, or coupling a plurality of unitary light guide plates 20 obtained by dividing the light guide plate unit 18 by chain lines (refer to FIGS. 6A and 6B) in parallel in a direction orthogonal to the parallel grooves 18f so that light exit planes 20a thereof can be coupled as a flat plane, and coupling half portions 20f of each of the unitary light guide plate 20 to both ends of this coupled body so that its thick end portion 20c and a thick end portion 20c of the unitary light guide plate 20 becoming an end of the coupled body are connected to each other.

Structures and shapes of the unitary light guide plate 19 and the unitary light guide plate 20 are described below, thereby describing in detail a configuration of the light guide plate unit 18 which is the second embodiment of the first aspect of the present invention.

Figure 5A:
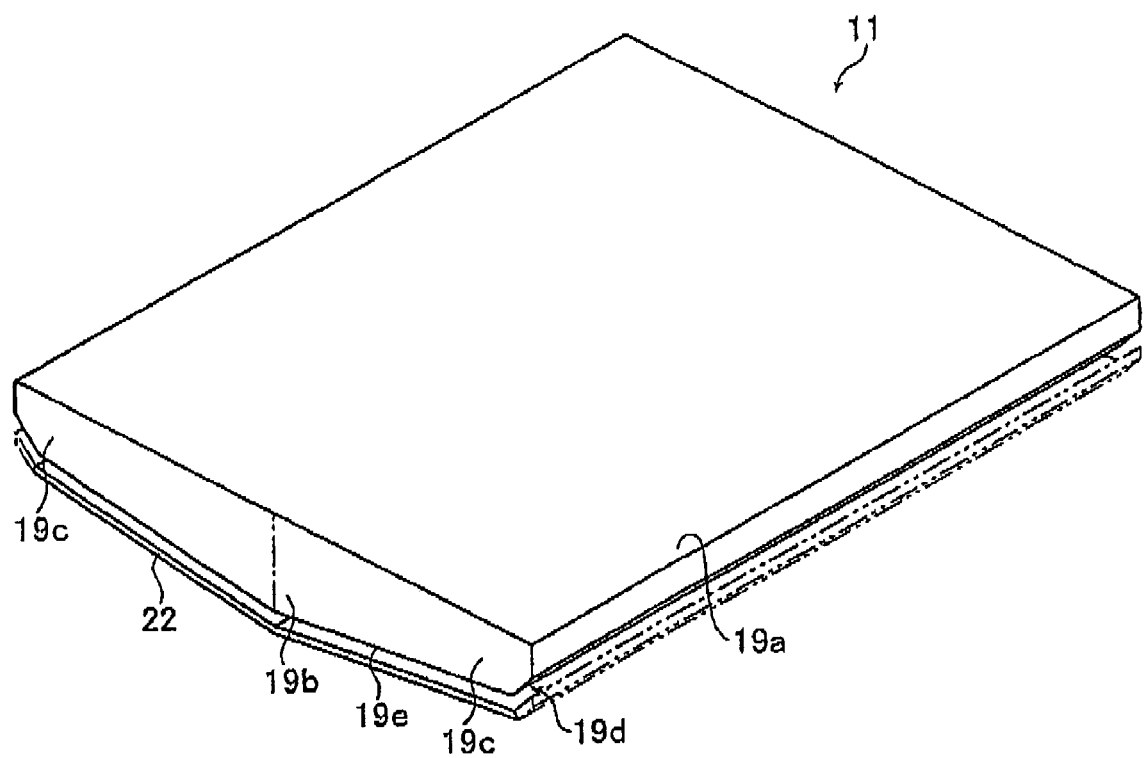
FIG. 5A is a schematic perspective view of a lighting device main body of a unitary light guide plate portion of the present invention.
Figure 5B:
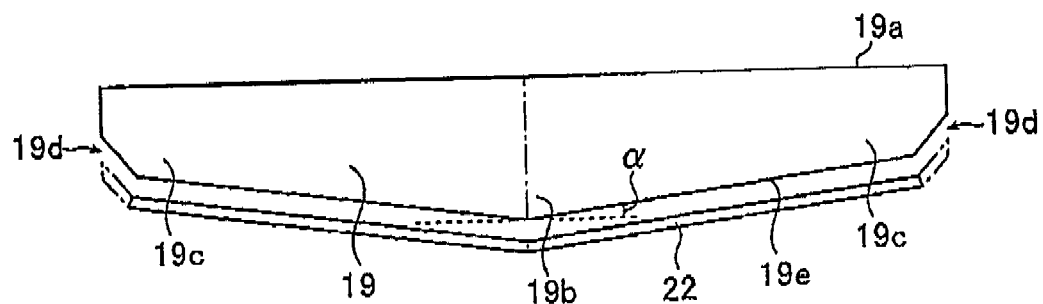
FIG. 5B is a schematic partial sectional view of the lighting device main body of the unitary light guide plate portion of the present invention.

FIGS. 5A and 5B are a schematic perspective view and a schematic partial sectional view of a part of the unitary light guide plate 19 of the first aspect of the present invention, which becomes one unit constituting the light guide plate unit 18.

As illustrated in FIGS. 5A and 5B, the unitary light guide plate 19 of the first embodiment of the first aspect of the present invention includes a rectangular light exit plane 19a, a thick portion 19b located substantially in the center of the light exit plane 19a in parallel to one side of the light exit plane 19a, thin end portions 19c formed at both ends of the thick portion 19b in parallel to the thick portion 19b, a half 19d of the parallel groove 18f formed in the backside of the thin end portion 19c of the light exit plane 19a to accommodate a linearly arranged light source 12b, and inclined backsides 19e disposed in both sides of the thick portion 19b to be gradually thinner from the thick portion 19b toward the thin end portion 19c along a direction orthogonal to the parallel groove 18f (the one side). In other words, the unitary light guide plate 19 has the rectangular light exit plane 19a, and made of a transparent resin. The unitary light guide plate 19 has one plane to become the light exit plane 19a which is formed flat and other planes incline so as to be thinner from the thick portion 19b substantially located in the center toward the thin end portions 19c at both ends.

The unitary light guide plate 19 includes scattering means for scattering light emitted from the light source 12 and propagated through the unitary light guide plate 19. Note that the scattering means is described below.

In the illustrated example, the halves 19d of the parallel groove 18f are formed in the thin end portions 19c at both sides of the backside of the light exit plane 19a of the unitary light guide plate 19. However, in the present invention, forming positions are not limited to both sides. A half 19d may be formed in one of the thin end portions 19c in the backside of the light exit plane 19a.

When a light guide plate unit 18 is configured by using the unitary light guide plate 19, as illustrated in FIG. 3, two or more (four in the illustrated example) unitary light guide plates 19 (indicated by dotted lines of FIG. 3) of the present invention having the above-mentioned shape are coupled together so that light exit planes 19a can form flush plane (light exit plane 18a) and, in a direction orthogonal to a parallel groove 18f (horizontal direction in the drawing), halves 19d of parallel grooves 18f of the adjacent unitary light guide plates 19 can form parallel grooves 18f for accommodating linearly arranged light sources 12b. Thus, the light guide plate unit 18 of the second embodiment of the first aspect of the present invention is formed.

Figure 6A:
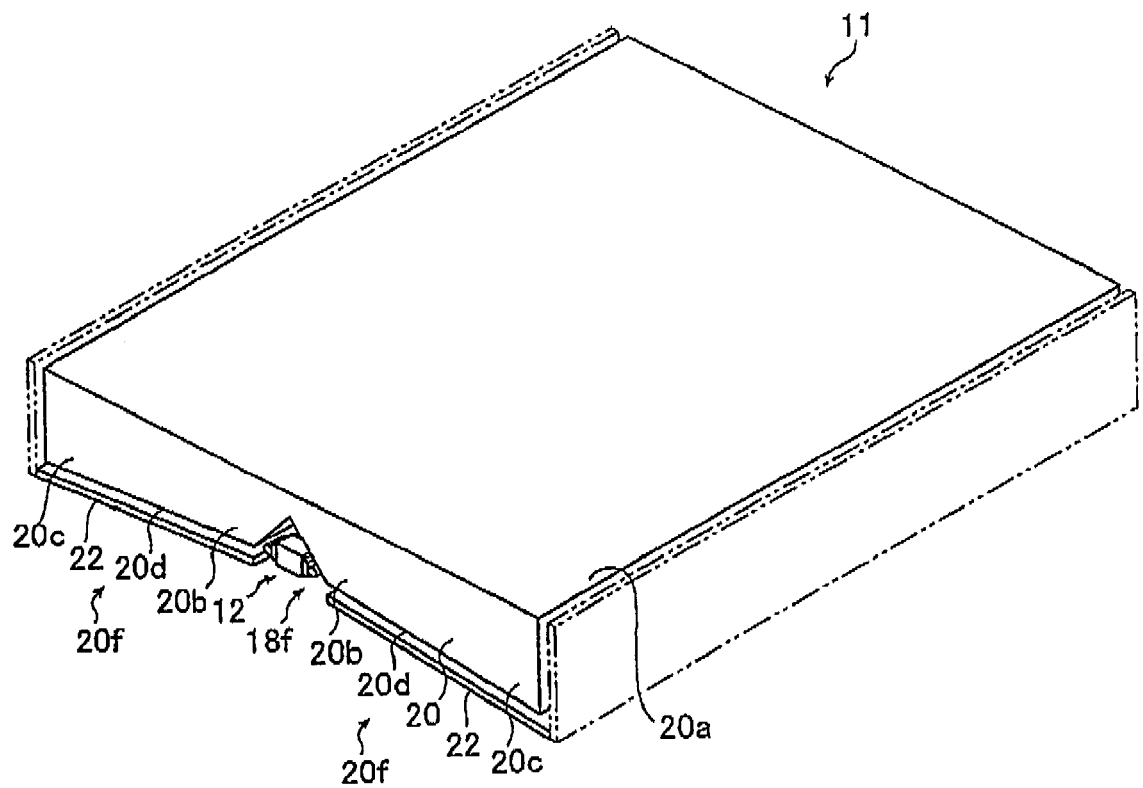
FIG. 6A is a schematic perspective view of a lighting device main body of the unitary light guide plate portion of the present invention.
Figure 6B:
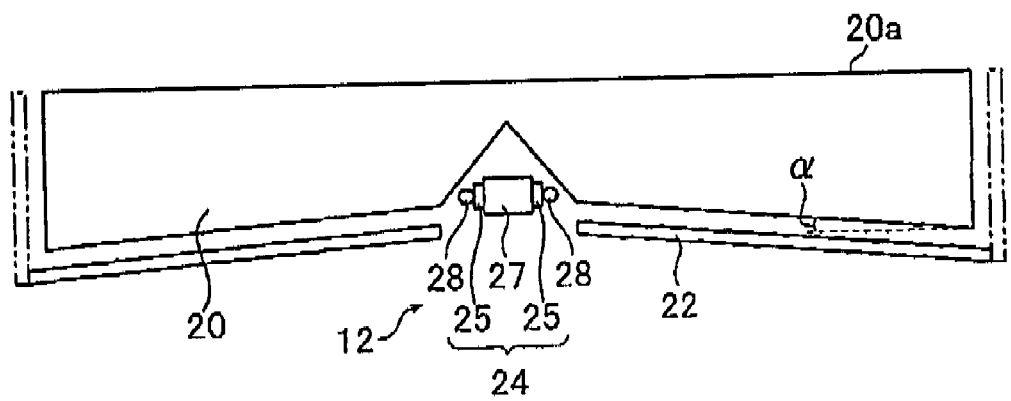
FIG. 6B is a schematic partial sectional view of the lighting device main body of the unitary light guide plate portion of the present invention.

FIGS. 6A and 6B are a schematic perspective view and a schematic partial sectional view of the unitary light guide plate 20 of the first embodiment of the first aspect of the present invention which becomes one unit constituting the light guide plate unit 18.

As illustrated in FIGS. 6A and 6B, the unitary light guide plate 20 of the first embodiment of the first aspect of the present invention includes a rectangular light exit plane 20a, a thin portion 20b located substantially in the center of the light exit plane 20a in parallel to one side of the light exit plane 20a, thick end portions 20c formed at both ends of the thin portion 20b in parallel to the thin portion 20b, a parallel groove 18f formed in the thin portion 20b in the backside of the light exit plane 20a in parallel to the one side to accommodate a linearly arranged light source, and inclined backsides 20d disposed at both sides of the thin portion 20b to be gradually thicker from the thin portion 20b toward the thick end portions 20c along a direction orthogonal to the one side. In other words, the unitary light guide plate 20 is a flat plate having a rectangular surface, and made of a transparent resin. The unitary light guide plate 20 includes one plane formed flat and the other plane having the parallel groove 18f in the thin portion 20b substantially located in the center and inclining such that the plate 20 has a thickness thinner from the thin portion 20b toward the thick end portions 20c at both ends.

The unitary light guide plate 20 includes scattering means for scattering light emitted from the light source 12 and propagated through the unitary light guide plate 20.

When a light guide plate unit 18 is configured by using the above-mentioned unitary light guide plate 20, as illustrated in FIG. 3, by coupling two or more (four in the illustrated example) unitary light guide plates 20 (indicated by dotted lines of FIG. 3) of the present invention having the above-mentioned shape so that light exit planes 20a can form a flush plane (light exit plane 18a) and thick end portions 20c can be coupled together in a direction orthogonal to a parallel groove 18f, and further coupling thick end portions of half portions 20f of the unitary light guide plates 20 to thick end portions at both ends of the coupled unitary light guide plates 20, a light guide plate unit 18 of the second embodiment of the first aspect of the present invention is formed. The half portions 20f of the unitary light guide plate 20 are formed by dividing the unitary light guide plate 20 into two equal parts in the direction orthogonal to the parallel groove 18f.

As described above, in the illustrated example, the light guide plate unit 18 is formed by coupling the thick end portions of the half portions 20f of the unitary light guide plates 20 to the thick end portions at both ends of the coupled unitary light guide plate 20. However, the present invention is not limited to this. Without coupling anything to the thick end portions at both ends of the coupled unitary light guide plate 20, a reflection film 22 described below may be disposed.

In the light guide plate unit 18 of the second embodiment formed by using the unitary light guide plate 19 or 20 of the first embodiment of the first aspect of the present invention and having the above-mentioned shape, among light emitted from the light sources 12a disposed in the parallel grooves 18f or the light sources 12b disposed in the end planes of the light guide plate unit 18 in the direction orthogonal to the parallel grooves 18f, light entered through side walls constituting the parallel groove 18f or the end planes into the light guide plate unit 18 passes inside the light guide plate unit 18 to exit from the light exit plane 18a, or is reflected on the inclined planes 18b to exit from the light exit plane 18a. In this case, light partly leaks from the bottom plane of the light guide plate unit 18. However, the leaked light is reflected on the reflection film 22, described below, formed on the inclined plane 18b side of the light guide plate unit 18, to enter the light guide plate unit 18 again, and then exits from the light entrance plane 18a. Thus, uniform light is emitted from the light exit plane 18a of the light guide plate unit 18.

The light guide plate unit 18 is formed to be gradually thicker in the direction orthogonal to the parallel groove 18f from the parallel groove 18f in which the light source 12a is disposed or the end plane of the light guide plate unit 18, along which the light source 12b is disposed, in the direction orthogonal to the parallel groove 18f, toward a substantially middle point (coupled portion of the thick portions of the unitary light guide plate 19 or the thick end portions of the unitary light guide plate 20) between the adjacent parallel grooves 18f or between the end plane and the parallel groove 18f adjacent to each other, whereby light entered to the light guide plate unit 18 can reach far. The light guide plate unit 18 can be made thinner than a light guide plate of a flat plate shape or a wedge shape. In other words, according to the present invention, the light guide plate unit 18 enables light emitted from the light source to reach far, and can be thinned and reduced in weight. That is, since incident angles are gradually made shallow in the case of full reflection, and light is difficult to exit from the light exit plane to the outside, an incident light can reach deeper. Accordingly, the planar lighting device can be reduced in weight, thinned, and enlarged. Thinning the light guide plate unit 18 can make the light guide plate unit 18 itself flexible. As a result, by combining the light guide plate unit 18 with a flexible liquid crystal, a flexible LCD monitor or a flexible television (TV) can be realized.

In the first aspect of the present invention, preferably, a depth of the parallel groove 18f of the light guide plate unit 18 is set so as to prevent bulging of a part of the light source 12a from the bottom plane of the light guide plate unit 18, and is set in view of a size of the light source 12a, mechanical strength of the light guide plate unit 18, and time-depending changes. A thickness of the light guide plate unit 18 can be optionally changed according to the size of the light source 12.

A sectional shape of the parallel groove 18f of the light guide plate unit 18 is not limited to a triangle illustrated in each of FIGS. 3, 6A and 6B, and 7A. A shape illustrated in FIG. 7B where a tip of a triangle is round, a parabolic shape illustrated in FIG. 7C, or a shape illustrated in FIG. 7D, which is formed from two convex curves formed toward the center of the parallel groove 18f, may be employed. Any shape can be used as long as the parallel groove 18f can accommodate the light source 12b.

Any shape can be used for the light guide plate unit 18 as long as a thickness of the light guide plate unit 18 is made gradually larger in the direction orthogonal to the parallel groove 18f from the parallel groove 18f or the end plane of the light guide plate unit 18 in the direction orthogonal to the parallel groove 18f, toward the substantially middle point (coupled portion of the thick portions of the unitary light guide plate 19 or the thick end portions of the unitary light guide plate 20) between the adjacent parallel grooves 18f or between the end plane of the light guide plane unit 18 in a direction orthogonal to the adjacent parallel grooves 18f and the parallel groove 18f. For example, the inclined plane 18b (inclined backside 19e or 20d) located on the backside of the light exit plane 18a of the light guide plate unit 18 may be curved.

In the illustrated example, the light guide plate unit 18 is configured, as described above, by coupling the unitary light guide plates 19 or 20 only in the direction orthogonal to the parallel grooves 18f. However, in the first aspect of the present invention, the configuration is not limited to this. Two or more light guide plate units 18 may be coupled together so as to array the parallel grooves 18f thereof collinearly in a direction parallel to the parallel groove 18f.

Next, the unitary light guide plate 19 or 20 is described more in detail. For similar characteristic portions of the unitary light guide plates 19 and 20, the unitary light guide plate 19 is described as a representative example, and different portions thereof are described individually. Characteristics described here of the unitary light guide plates 19 and 20 are characteristics of the unitary light guide plate unit 18 configured by using these. Thus, needless to say, similar effects can be obtained.

Likewise, needless to say, the depth and the sectional shape of the parallel groove 18f and the diffusion reflector of the light guide plate unit 18 described above apply to the unitary light guide plates 19 and 20.

In the first aspect of the present invention, the unitary light guide plate 19, in other words, the light guide plate unit 18, includes scattering means for scattering light emitted from the light source 12 and propagated through the unitary light guide plate 19. There is no limitation on this scattering means, as long as it can sufficiently propagate the light entered into the unitary light guide plate 19. However, preferably, the scattering means is scattering particles which satisfy the following Expressions (1) and (2):

$$1.1 \leq \Phi \cdot N_P \cdot L_G \cdot K_C \leq 8.2 \tag{1}$$

$$0.005 \leq K_C \leq 0.1 \tag{2}$$

where, $\Phi$ denotes a scattering cross section of the scattering particles, $N_P$ denotes a density of the scattering particles contained in the unitary light guide plate, $L_G$ denotes a length half of one side of the light exit plane in the direction orthogonal to the parallel groove, and $K_C$ denotes a compensation coefficient).

The light guide plate unit 18 contains the scattering particles which satisfy such a relationship. Thus, a uniform illumination light of little brightness unevenness can be emitted from the light exit plane.

Generally, a transmittance T of the light beams admitted into an isotropic medium is expressed according to the Lambert-Beer law by the following Expression (7):

$$T = I/I_O = \exp(-\rho \cdot x) \tag{7}$$

where x is the distance, $I_O$ is the incident light intensity, I the outgoing light intensity, and $\rho$ the attenuation constant.

The attenuation constant $\rho$ is represented by using a particle scattering cross section $\Phi$ and the number of particles $N_p$ per unit volume contained in the medium:

$$\rho = \Phi \cdot N_p \tag{8}$$

Thus, when $L_G$ denotes a length of a half of the light guide plate in an optical axial direction, light extraction efficiency $E_{out}$ is represented by the following Expression (9). In this case, a length $L_G$ of a half of the light guide plate in the optical axial direction is a length from one light entrance plane of the light guide plate unit 18 to the center of the light guide plate unit 18 in a direction perpendicular to the light entrance plane of the light guide plate unit 18.

The light extraction efficiency is a ratio of light reaching a position away from the light entrance plane of the light guide plate in the optical axial direction by a length $L_G$ with respect to incident light. For example, in the case of the unitary light guide plate 19 illustrated in FIGS. 5A and 5B, the light extraction efficiency is a ratio of light reaching the center of the unitary light guide plate 19 (position which becomes a length of a half of the light guide plate in the optical axial direction) with respect to light incoming to the end plane:

$$E_{out} \propto \exp(-\Phi \cdot N_p \cdot L_G) \tag{9}$$

Expression (9) applies in a space having limited dimensions, and thus the compensation coefficient $K_C$ for compensating the relation with Expression (7) is introduced. The compensation coefficient $K_C$, obtained empirically, is a dimensionless compensation coefficient that applies to light propagating through an optical medium having limited dimensions. Accordingly, the light extraction efficiency $E_{out}$ is expressed by the following Expression (10).

$$E_{out} = \exp(-\Phi \cdot N_p \cdot L_G \cdot K_C) \quad (10)$$

According to Expression (10), when $\Phi \cdot N_p \cdot L_G \cdot K_C$ is 3.5, the light extraction efficiency $E_{out}$ is 3%, and when $\Phi \cdot N_p \cdot L_G \cdot K_C$ is 4.7, the light extraction efficiency $E_{out}$ is 1%.

This shows that the value $\Phi \cdot N_p \cdot L_G \cdot K_C$ increases with the decreasing light extraction efficiency $E_{out}$. The possible reason for this may be that light scatters around increasingly as light travels in the direction of the optical axis of the light guide plate, thus lowering the light extraction efficiency $E_{out}$.

Accordingly, it is shown that the greater the value $\Phi \cdot N_p \cdot L_G \cdot K_C$ is, the more preferable it is for the light guide plate. In other words, light emitted through the plane opposed to the light entrance plane can be reduced, and hence, light emitted from the light exit plane can be increased, by increasing the value $\Phi \cdot N_p \cdot L_G \cdot K_C$. In other words, the ratio of light emitted through the light exit plane with respect to the light incident on the entrance plane (hereinafter, also referred to as "light use efficiency") can be enhanced by increasing the value $\Phi \cdot N_p \cdot L_G \cdot K_C$. Specifically, the light use efficiency can be enhanced to 50% or more by setting the value $\Phi \cdot N_p \cdot L_G \cdot K_C$ to 1.1 or larger.

Note that as the value $\Phi \cdot N_p \cdot L_G \cdot K_C$ increases, illuminance unevenness of light emitted through the light exit plane 18a of the light guide plate 18 becomes more conspicuous. However, the illuminance unevenness can be held to a certain level or less (within an allowable range) by setting the value $\Phi \cdot N_p \cdot L_G \cdot K_C$ to 8.2 or less. Note that illuminance and brightness can be treated substantially equally. Thus, it is assumed in the present invention that illuminance and brightness possess similar tendencies.

From the above, the value $\Phi \cdot N_p \cdot L_G \cdot K_C$ preferably satisfies the relation to be 1.1 or more and 8.2 or less, and more preferably 2.0 or more and 7.0 or less. Still more preferably, the value $\Phi \cdot N_p \cdot L_G \cdot K_C$ is 3.0 or more and, most preferably, 4.7 or more.

The compensation coefficient $K_C$ is preferably 0.005 or more and 0.1 or less.

In the unitary light guide plate 19, in other words, the light guide plate unit 18, containing the scattering particles which satisfy the relationships of Expressions (1) and (2) enables appropriate scattering of the light entered into the light guide plate unit 18 in the light guide plate unit 18. Breaking the full-reflection condition, in the light guide plate itself, a function of emitting light difficult to exit is provided. Thus, light emitted from the light exit plane can be made more uniform.

Further, in order to provide the unitary light guide plate 19 provided with scattering means, the unitary light guide plate 19 is formed of a transparent resin into which scattering particles for scattering light are kneaded and dispersed. As transparent resin materials used to form the unitary light guide plate 19, there are optically transparent resins such as polyethylene terephthalate (PET), polypropylene (PP), polycarbonate (PC), polymethyl methacrylate (PMMA), benzyl methacrylate, MS resins, and cycloolefin polymer (COP). On the other hand, as the scattering particles kneaded and dispersed into the unitary light guide plate 19, for example, TOSPEARL (trademark), silicone, silica, zirconia, or a derivative polymer can be used. The unitary light guide plate 19 containing such scattering particles is capable of emitting uniform illumination light through the light exit plane with a reduced level of brightness unevenness.

The unitary light guide plate 19 as described above can be manufactured using an extrusion molding method or an injection molding method.

The unitary light guide plate 19 includes, in addition to the scattering means, transmittance adjusters added to the light exit plane 19a side of the unitary light guide plate 19 (light exit plane 18a side of the light guide plate unit 18). By appropriately adjusting an arrangement density of the transmittance adjusters, the more uniform light can be emitted.

The unitary light guide plate 19 may be manufactured by mixing a plasticizer into the above-mentioned transparent resin.

When the unitary light guide plate 19 is made of materials containing a transparent material mixed with a plasticizer, the light guide plate unit 18 is given flexibility or pliability such that the light guide plate can be formed into various shapes. Thus, the surface of the light guide plate can be formed into various curved surfaces.

Therefore, in cases where, for example, the light guide plate unit 18 or a planar lighting device using the light guide plate unit 18 is used as a display board employing ornamental lighting (illuminations), it can also be mounted to a wall having a curvature. Thus, the light guide plate can be used for a wider variety of applications and in a wider application range including ornamental lighting and point-of-purchase (POP advertising).

The plasticizer is exemplified by phthalic acid esters, or, specifically, dimethyl phthalate (DMP), diethyl phthalate (DEP), dibutyl phthalate (DBP), di(2-ethylhexyl) phthalate (DOP (DEHP)), di-n-octyl phthalate (DnOP), diisononyl phthalate (DINP), dinonyl phthalate (DNP), diisodecyl phthalate (DIDP), phthalate mixed-base ester ($C_6$ to $C_{11}$) (610P, 711P, etc.), and butyl benzyl phthalate (BBP). Besides phthalic acid esters, the plasticizer is also exemplified by dioctyl adipate (DOA), diisononyl adipate (DINA), dinormal alkyl adipate ($C_{6, 8, 10}$) (610A), dialkyl adipate ($C_{7, 9}$) (79A), dioctyl azelate (DOZ), dibutyl sebacate (DBS), dioctyl sebacate (DOS), tricresyl phosphate (TCP), tributyl acetylcitrate (ATBC), epoxidized soybean oil (ESBO), trioctyl trimellitate (TOTM), polyesters, and chlorinated paraffins.

In the unitary light guide plate 19, there is no particular limitation on surface roughness Ra of the unitary light guide plate 19, in other words, surface roughness of the light exit plane 19a of the unitary light guide plate 19. However, preferably, the following Expression (3) is satisfied, where $Ra_1$ denotes surface roughness of the light exit plane 19a in a direction parallel to the parallel groove 18f, and $Ra_2$ denotes surface roughness of the light exit plane 19a in a direction orthogonal to the parallel groove 18f:

$$Ra_2 < Ra_1 \text{ and } Ra_2 < 100 \quad (3)$$

In the unitary light guide plate 19 of the first embodiment of the first aspect of the present invention, preferably, an angle α formed when a plane parallel to the light exit plane 19a of the unitary light guide plate 19 and the inclined plane of the inclined backside 19e (20d) cross each other at a vertex of the thick portion 19b (or thick end portion 20c) satisfies the following Expression (4):

$$0° < \alpha < 45° \quad (4)$$

Setting the angel α formed when the plane parallel to the light exit plane 19a of the unitary light guide plate 19 and the inclined plane of the inclined backside 19e (20d) cross each other at the vertex of the thick portion 19b (or thick end portion 20c) to over 0° enables efficient propagation of light flux entered into the light guide plate, and setting the angle α to less than 45° enables maintenance of high emission efficiency.

In the first aspect of the present invention, in the unitary light guide plate 19, there is no particular limitation on a relationship between a maximum thickness T in a direction perpendicular to the light exit plane 19a and a distance D between the adjacent light sources 12a (or 12a and 12b). However, when the distance D between the adjacent light sources 12a (or 12a and 12b) is more than 10 times the maximum thickness in the direction perpendicular to the light exit plane 19a, or less than 100 times the maximum thickness in the direction perpendicular to the light exit plane 19a, emission efficiency can be maintained while keeping a brightness distribution of outgoing light. Thus, preferably, the following Expression (5) is satisfied:

$$10T<D_1<1{,}000T \quad (5)$$

where T denotes a maximum thickness of the unitary light guide plate, and $D_1$ denotes a distance between the light sources.

Any shape can be employed for the unitary light guide plate 19, as long as one plane is flat, and the other plane is inclined such that the thickness of the plate is gradually thinner from the thick portion 19b located in the substantial center toward the thin end portions 19c at both ends. For example, the inclined plane of the inclined portion 19e of the unitary light guide plate 19 may be curved. Similarly, any shape can be employed for the unitary light guide plate 20, as long as one plane of the unitary light guide plate 20 is flat, and the other plane thereof has the parallel groove 18f in the thin portion 20b located in the substantial center and is inclined so as to be thinner from the thin portion 20b toward the thick end portions 20c of both ends. For example, the inclined plane of the inclined backside 20d of the unitary light guide plate 20 may be curved.

Figure 8:
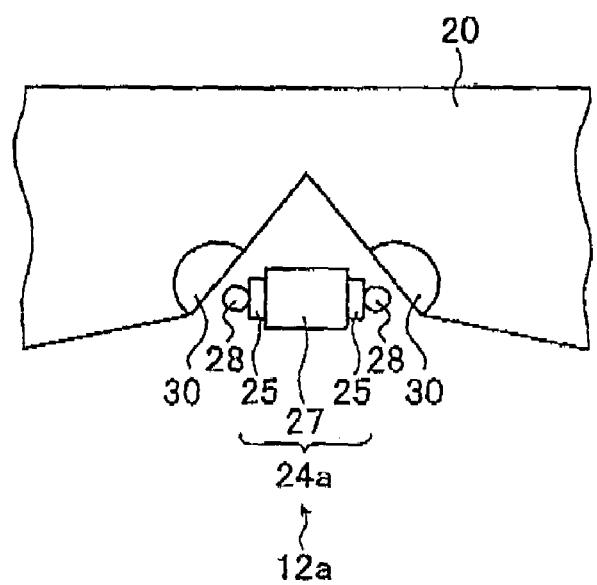
FIG. 8 is a schematic sectional view of a part of the unitary light guide plate or light guide plate unit of the present invention which includes a low refractive-index member.

Further, in the first aspect, as illustrated in FIG. 8, incorporating a low refractive index member 30 having a lower refractive index than the base material of the unitary light guide plate 19 or 20 in a part including the entrance plane of the light from the light source 12 and admitting light emitted by the light source into the low refractive index member 30 enables reduction of Fresnel loss of light emitted by the light source and admitted through the light entrance plane, which increases the light admission efficiency.

Further, the low refractive index member 30 has a function to collimate and mix admitted light, i.e., a function performed by the coupling lens and the mixer. The backlight unit according to the first aspect, provided with the low refractive index member, allows light emitted by the light source 12 to reach a farther position without the coupling lens and the mixer and is capable of emitting uniform light free from brightness unevenness.

The light exit plane 19a or 20a of the unitary light guide plate 19 or 20 is preferably formed of a low refractive index member substantially in its entirety. When substantially the entire surface of the light exit plane is formed of a low refractive index member, light emitted by the light source and entering the light guide plate can be admitted into the low refractive index member, which further improves the light admission efficiency.

While the low refractive index member 30 of FIG. 8 has the shape of a half cylinder curving outward toward the plane opposite to the light entrance plane, the present invention is not limited thereto.

When the light guide plate unit 18 is configured by using the unitary light guide plate 19 or 20 as described above, an inclined angle of the inclined plane of the unitary light guide plate 19 or 20 can be adjusted so as to prevent crossing between the inclined plane of one unit light guide plane 19 or 20 and the inclined plane of the other unit light guide plane 19 or 20 coupled thereto, in other words, so as to form a smooth plane or curve in the coupled portion of the inclined planes.

The light guide plate unit 18, and the unitary light guide plates 19 and 20 are basically configured as described above.

Next, in the lighting device main body 11 illustrated in FIG. 3, the diffusion sheet 14 is used to diffuse and render uniform the light emitted through the light exit plane 18a of the light guide plate unit 18. The diffusion sheet 14 is formed by imparting a light scattering property to a flat sheet material made of an optically transparent resin as exemplified by polyethylene terephthalate (PET), polypropylene (PP), polycarbonate (PC), polymethyl methacrylate (PMMA), benzyl methacrylate, MS resins, and other acrylic resins, and cycloolefin polymer (COP). The method of forming the diffusion sheet 14 is not limited specifically. For example, a surface of the flat-plate material may be roughened to impart the light scattering property by machining to provide an asperity on the surface or by grinding (a surface subjected to such roughening is hereinafter referred to as "sand-rubbed surface"). The diffusion sheet may be alternatively formed by coating its surface with a material that diffuse light as exemplified by silica, pigments such as titanium oxide and zinc oxide, a resin, and beads of glass, zirconia, etc., together with a binder, or by kneading the above-mentioned pigments or beads having a light scattering property into the above-mentioned resin. In the present invention, as the diffusion layer 14, a diffusion sheet of a matte type or a coating type can be used.

In the first aspect of the present invention, as the diffusion sheet 14, it is also preferable to use a film material with a thickness of 500 μm or less using the above-mentioned material and imparted with light scattering property.

As illustrated in FIG. 3, the diffusion sheet 14 is disposed on the light exit plane side of the prism sheet 17. The diffusion sheet 14 is formed by imparting a light diffusing property to a material in the form of film. The material in the form of film may be formed, for example, of an optically transparent resin such as polyethylene terephthalate (PET), polypropylene (PP), polycarbonate (PC), polymethyl methacrylate (PMMA), benzyl methacrylate, an MS resin, or cycloolefin polymer (COP).

The method of manufacturing the diffusion sheet 14 is not limited specifically. For example, a surface of the material in the form of film may be machined to form an asperity thereon or roughened by grinding, thereby to provide a light diffusing property, or by coating the surface with a material that diffuses light as exemplified by silica, pigments such as titanium oxide and zinc oxide, a resin, and beads of glass, zirconia, etc., together with a binder, or by kneading the above-mentioned pigments or beads that diffuse light into the transparent resin. Otherwise, a material having a high reflectance and a low light-absorbing property, such as metals as exemplified by Ag and Al can be used to form the diffusion sheet 14.

In the first aspect of the present invention, a diffusion film of a matte type or a coating type may be used as the diffusion sheet 14.

Preferably, the diffusion sheet 14 is disposed a given distance apart from the light exit plane 18a of the light guide plate unit 18. The distance may be altered as appropriate according to the light amount distribution of light emitted from the light exit plane 18a of the light guide plate unit 18. With the diffusion sheet 14 spaced apart a given distance from the light exit plane 18a of the light guide plate unit 18, the light emitted from the light exit plane 18a of the light guide plate unit 18 is subjected to further mixing (mixture) between the light exit plane 18a and the diffusion sheet 14. This further enhances the uniformity of brightness of the light passing through the diffusion sheet 14 to illuminate the liquid crystal display panel 4. As the method of spacing the diffusion sheet 14 from the light guide plate unit 18a of the light guide plate unit 18 by a given distance, for example, the method of providing a spacer between the diffusion sheet 14 and the light guide plate unit 18 can be used.

When, in particular, it is allowable to slightly increase the thickness of the lighting device main body 11, the peak value of brightness on the light exit plane 18a of the light guide plate unit 18 corresponding to the parallel groove 18f does not need to be reduced sufficiently by providing a certain sectional shape of the parallel groove 18f of the light guide plate unit 18, and uniformity of the brightness distribution of the illumination light emitted from the diffusion sheet 14 may be achieved by reducing the peak value only partially and providing a gap between the diffusion sheet 14 and the light exit plane 18a of the light guide plate unit 18. Also in cases where there is a limit to the improvement that can be made in the sectional shape of the parallel groove 18f of the light guide plate unit 18 (i.e., tapering of the tip end portion of the parallel groove) and hence the peak value of illuminance in the light exit plane 18a of the light guide plate unit 18 corresponding to the parallel groove 18f cannot be fully or sufficiently reduced, a gap may be provided between the diffusion sheet 14 and the light exit plane 18a of the light guide plate unit 18 to render uniform the brightness distribution of the illumination light emitted from the diffusion sheet 14.

The prism sheets 16 and 17 are transparent sheets formed by arranging a plurality of prisms in parallel and enhance the light harvesting property of the light emitted from the light exit plane 18a of the light guide plate unit 18 to improve the brightness. One of the prism sheets 16 and 17 is disposed such that its prism array extends parallel to the parallel groove 18f of the light guide plate unit 18 whereas the other is disposed such that its prism array extends perpendicular to the parallel groove 18f of the light guide plate unit 18. In other words, the prism sheets 16 and 17 are disposed such that their respective prism arrays extend in directions perpendicular to each other. Further, the prism sheet 16 is provided such that the vertex angles of the prisms face the light exit plane 18a of the light guide plate unit 18. The order of arranging the prism sheets 16 and 17 may be such that the prism sheet 16 having prisms that extend in a direction parallel to the parallel groove of the light guide plate is provided immediately above the light guide plate and that the prism sheet 17 having prisms that extend in a direction perpendicular to the parallel groove 18f of the light guide plate unit 18 is provided on top of the prism sheet 16. The order of arrangement of the two prism sheets may be reversed.

While prism sheets are used in the illustrated case, they may be replaced with sheets on which optical elements similar to the prisms are regularly arranged. Alternatively, sheets on which elements having lens effects, for example, lenticulated lenses, concave lenses, convex lenses, or optical elements in pyramidal shape are regularly arranged may be substituted for the prism sheets.

In the first aspect of the present invention, preferably, a prism sheet is disposed between the reflection film 22 described below and the inclined plane 18d of the light guide plate unit 18. The prism sheet (not shown) disposed between the reflection film 22 and the inclined plane 18d of the light guide plate unit 18 is preferably arranged so that an extending direction of the prism is perpendicular to the parallel groove 18f of the light guide plate unit 18 and a vertex angle of the prism face the inclined plane 18b of the light guide plate unit 18.

While the illustrated example uses the prism sheets, optical elements having effects similar to those of prisms may be used. In addition, a sheet on which optical elements having lens effects such as lenticular lenses, concave lenses, convex lenses, or pyramid-shaped lenses are arranged regularly may be used.

In the illustrated case, the prism sheets 16 and 17 are used, and more preferably, the prism sheet is used between the reflection film 22 and the inclined plane 18d of the light guide plate unit 18. However, if the illuminance on the light exit plane 18a as achieved by the parallel groove 18f of the light guide plate unit 18 is made to be further uniform, naturally, the prism sheets are unnecessary, and the prism sheet 16 or 17 or both may be dispensed with. Using a smaller number of expensive prism sheets or dispensing with all these prism sheets contributes to reducing the costs for the device.

Further, while the prism sheets having prism arrays formed thereon are disposed on the light exit plane 18a, like effects may be obtained by forming prism arrays on the inclined plane 18b of the light guide plate unit 18. In other words, prism arrays formed on the inclined plane also help condense the light emitted through the light exit plane 18a to improve brightness. Further, instead of such prism arrays, optical elements similar to prisms may be formed regularly. For example, lenticular lenses, concave lenses, convex lenses, or an optical element in pyramidal shape having lens effects may be formed on the inclined plane of the light guide plate.

In this embodiment, the reflection film 22 is for reflecting light leaked from the inclined plane 18b of the light guide plate unit 18 to enter the light to the light guide plate unit 18 again, and can increase light emission efficiency. The reflection film 22 is formed to cover the inclined plane 18b of the light guide plane unit 18 or the lateral plane thereof when necessary.

The reflection films 22 may be formed of any material that is capable of reflecting the light leaking from the inclined plane 18b of the light guide plate unit 18. It may be formed, for example, of a resin sheet produced by kneading PET, polypropylene (PP), etc. with a filler and then drawing the resultant mixture to form voids therein to increase the reflectance, a sheet with a specular surface formed by, for example, depositing aluminum vapor on the surface of a transparent resin sheet or a white resin sheet as described above, a metal foil such as an aluminum foil, or a resin sheet carrying a metal foil, or a metal thin plate having sufficient reflective property on the surface.

In this embodiment, nothing is disposed below the backside (lower side in the drawing) of the light source 12b. However, when necessary, a reflector may be disposed in order to reflect light from the bottom plane of the light source 12b and to enter the light from the inside of the parallel groove 18f of the light guide plate unit 18. The reflector can be made of, for example, a material similar to that of the reflection film, in other words, a resin material, metallic foil, or a metal plate each having sufficient reflectivity on its surface, and there is no particular limitation on its shape.

In this embodiment, a transmittance adjusting member having a function of reducing brightness unevenness of a light emitted from the light exit plane 14a may be disposed on the light exit plane 14a side of a planar lighting device 2 which is the third embodiment of the first aspect of the present invention.

The transmittance adjusting member is used for reducing brightness unevenness of light emitted from the light guide plate unit 18 as described above, and normally includes a transparent film and many transmittance adjusters disposed in a surface of the transparent film. There is no limitation on this transmittance adjusting member in this embodiment.

As described above, the transmittance adjusting member is used to reduce brightness unevenness of light emitted from the light guide plate unit 18 and includes a transparent film and numerous transmittance adjusters arranged on the surface of the transparent film.

The transparent film is in the form of a film and formed of optically transparent resins such as polyethylene terephthalate (PET), polypropylene (PP), polycarbonate (PC), polymethyl methacrylate (PMMA), benzyl methacrylate, MS resins, other acrylic resins, or cycloolefin polymer (COP).

The transmittance adjusters are dots of various sizes each having a given transmittance and have various shapes such as a rectangle, a circle, and a hexagon. The transmittance adjusters are formed, by printing for example, on the entire surface of the transparent film on the light guide plate unit 18 side in a given pattern, or in such a pattern, for example, that the sizes of dots or the number of dots vary according to the location (halftone dot pattern).

The transmittance adjusters only need to be diffusion reflectors and may, for example, be formed by applying a material that diffuses light as exemplified by silica, pigments such as titanium oxide and zinc oxide, a resin, and beads of glass, zirconia, etc., together with a binder, or may be a pattern created by machining a surface to form an asperity thereon or by grinding a surface to roughen the surface. Otherwise, a material having a high reflectance and a low light-absorbing property, such as metals as exemplified by Ag and Al can be used.

Further, as transmittance adjusters, ordinary white ink as used in screen printing, offset printing, etc can be used. As an example, ink obtained by dispersing titanium oxide, zinc oxide, zinc sulfate, barium sulfate, etc. into acrylic binder, polyester binder, vinyl chloride binder, etc., or ink given a diffusing property by mixing titanium oxide with silica can be used.

In the first aspect of the present invention, for the light source 12, while there is no particular limitation, a light emission distribution of the light source 12 is preferably larger in the direction (horizontal direction in FIG. 1) orthogonal to the parallel groove 18f than in the ceiling direction (upward in FIG. 1) of the parallel groove 18f of the light guide plate unit 18. As an example, in the embodiment, the LED that emits a white light is used. However, the present invention is not limited to this. For example, a white color can be obtained by using LEDs of three colors of red, green, and blue, and mixing light emitted from the LEDs via a coupling lens.

In the embodiment, the LED is used for the light source. However, the present invention is not limited to this. For example, point-like light sources such as semiconductor lasers (LD), tungsten lamps, or xenon lamps may be linearly arrayed along the parallel grooves 18f. In this case, preferably, a distance $D_2$ between the point-like light sources satisfies the following Expression (6):

$$10 \text{ mm} < D_2 \tag{6}$$

For the light source 12, a linear light source such as a fluorescent tube, a cold cathode tube, a hot cathode tube, or an external electrode tube may be used.

In the embodiment, the light sources 12b are arranged in both end planes of the light guide plate unit 18 in the direction orthogonal to the parallel groove 18f. However, the present invention is not limited to this. Light sources 12a may be disposed only in the parallel grooves 18f.

Figure 9A:
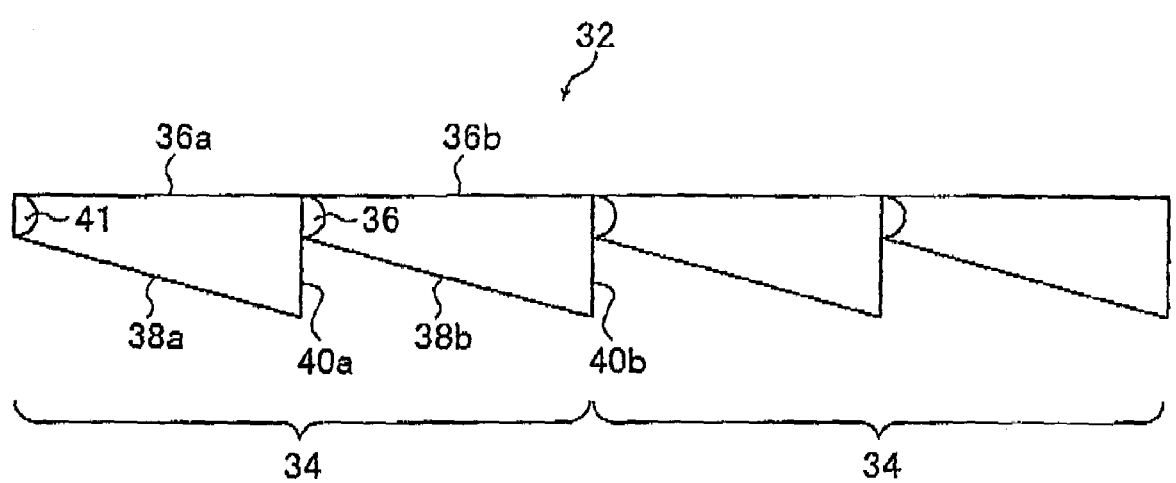
FIG. 9A is a schematic sectional view of another embodiment of a light guide plate unit of the present invention.
Figure 9B:
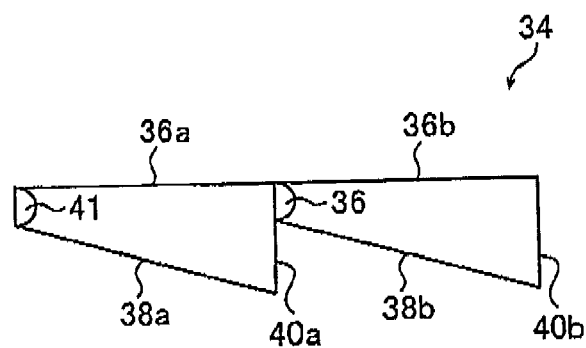
FIG. 9B is a schematic sectional view of another embodiment of a unitary light guide plate of the present invention.

FIGS. 9A and 9B illustrate another example of a light guide plate unit.

FIG. 9A is a schematic sectional view of another aspect of the light guide plate unit 18 of the second embodiment of the first aspect of the present invention, and FIG. 9B is a schematic sectional view of a unitary light guide plate constituting the light guide plate unit illustrated in FIG. 9A.

As illustrated in FIG. 9A, the light guide plate unit 32 is configured by coupling together a plurality of unitary light guide plates 34 as in the case of the light guide plate unit 18 configured by coupling together the plurality of unitary light guide plates 19 or 20.

As illustrated in FIG. 9B, the unitary light guide plate 34 includes substantially rectangular light exit planes 36a and 36b, an inclined plane 38b located on a side opposed to the light exit plane 36b and inclined at a predetermined angle with respect to the light exit plane 36b sandwiching a light source 36, a light entrance plane 40b away from the light source 36 by an amount substantially equal to the light exit plane, a light entrance plane 40a parallel to the light entrance plane 40b having its top portion brought into contact with the light source 36, and an inclined plane 38a located on a side opposed to the light entrance plane 36a and inclined at a predetermined angle with respect to the light exit plane 36a sandwiching a light source 41.

With this configuration, the light emitted from the light source 36 substantially located in the center of the light guide plate unit 34 is spread from the thin portion near the light source 36 toward the light exit plane 40b, in other words, in a thicker direction (right direction in the drawing). Thus, the light emitted from the light source 36 can reach far. Forming the light guide plate unit to be gradually thinner from the light source 36 toward the light source 41 enables light to reach the vicinity of the light source 41 from the light source 36. In other words, the unitary light guide plate having this configuration can spread the light emitted from the light source to the unitary light guide plates located at both left and right sides in the drawing.

As illustrated in FIG. 9A, the light guide plate unit 32 is formed by coupling the light entrance plane of the adjacent unitary light guide plate and the light source to each other, and thus the plurality of unitary light guide plates 34 are integrally formed to have a coupled shape. The light guide plate unit 32 is arranged to have all the light exit planes in parallel to form the same plane.

Coupling the plurality of unitary light guide plates 34 in this manner enables configuration of a large light guide plate.

The first aspect of the present invention is basically as described above.

The unitary light guide plate, the light guide plate unit, and the planar lighting device of the first aspect of the present invention have been described in detail. However, the present invention is not limited to the above-mentioned embodiments. Needless to say, various improvements and changes can be made without departing from the scope and the spirit of the present invention.

Further, a plurality of diffusion reflectors may be formed, by printing for example, on the inclined plane 18b of the light guide plate unit 18, which is located on a rear side of the light exit plane 18a, illustrated in FIG. 3 in a given pattern, specifically in such a pattern that the density is high in the vicinity of the parallel groove 18f of the light guide plate unit 18, that is, in the vicinity of the linear light source 12, and the density decreases toward substantially the center of the parallel groove 18*f* and the parallel groove 18*f* or toward substantially the center located between the parallel groove 18*f* and the end plane of the light guide plate unit 18 in a direction perpendicular to the parallel groove 18*f*, that is, decreases as the thickness of the light guide plate unit 18*f* becomes thicker. Such diffusion reflectors formed on the inclined plane 18*b* of the light guide plate unit 18 in a given pattern can limit generation of bright lines or unevenness in the light exit plane 18*a* of the light guide plate unit 18. Further, instead of printing the diffusion reflectors on the inclined plane 18*b* of the light guide plate unit 18, a thin sheet including the diffusion reflectors formed thereon in a given pattern may be disposed between the inclined plane 18*b* of the light guide plate unit 18 and the reflection sheet 22 described below. The diffusion reflectors may each have any shape such as a rectangle, a polygon, a circle, and an ellipse.

Here, the diffusion reflectors may be formed, for example, by applying a material for diffusing light as exemplified by silica, pigments such as titanium oxide and zinc oxide, a resin, and beads of glass, zirconia, etc., together with a binder, or may be a pattern created by machining the surface to form an asperity thereon or by grinding to roughen the surface. Otherwise, a material having a high reflectance and a low light-absorbing property, such as metals as exemplified by Ag and Al may be used. Further, as the diffusion reflectors, ordinary white ink as used in screen printing, offset printing, etc. may be used. As an example, ink obtained by dispersing titanium oxide, zinc oxide, zinc sulfate, barium sulfate, or the like into acrylic binder, polyester binder, vinyl chloride binder, or the like, or ink given a diffusing property by mixing titanium oxide with silica may be used.

While the diffusion reflectors are distributed at a density that decreases with the increasing distance from the linear light source 12 in this embodiment, the present invention is not limited thereto and may be determined as appropriate according to the intensity or distribution of bright lines, brightness distribution required of emitted light, etc. The diffusion reflectors, for example, may be distributed evenly on the entire surface of the inclined planes or at a density that decreases with the increasing distance from the light entrance plane. Further, instead of providing the diffusion reflectors by printing, the locations corresponding to the diffusion reflectors may be roughened to provide sand-rubbed surfaces.

It should be noted that the diffusion reflectors are not limited to be provided on the inclined plane of the light guide plate unit 18, and may be provided on any plane as desired except the light entrance plane. For example, the diffusion reflectors may be provided on the light exit plane 18*a* or on the inclined plane 18*b* and the plane opposite to the light entrance plane.

Next, a liquid crystal display device provided with the planar lighting device according to the second aspect of the present invention is described in detail by way of the embodiments illustrated in the attached drawings.

Figure 10A:
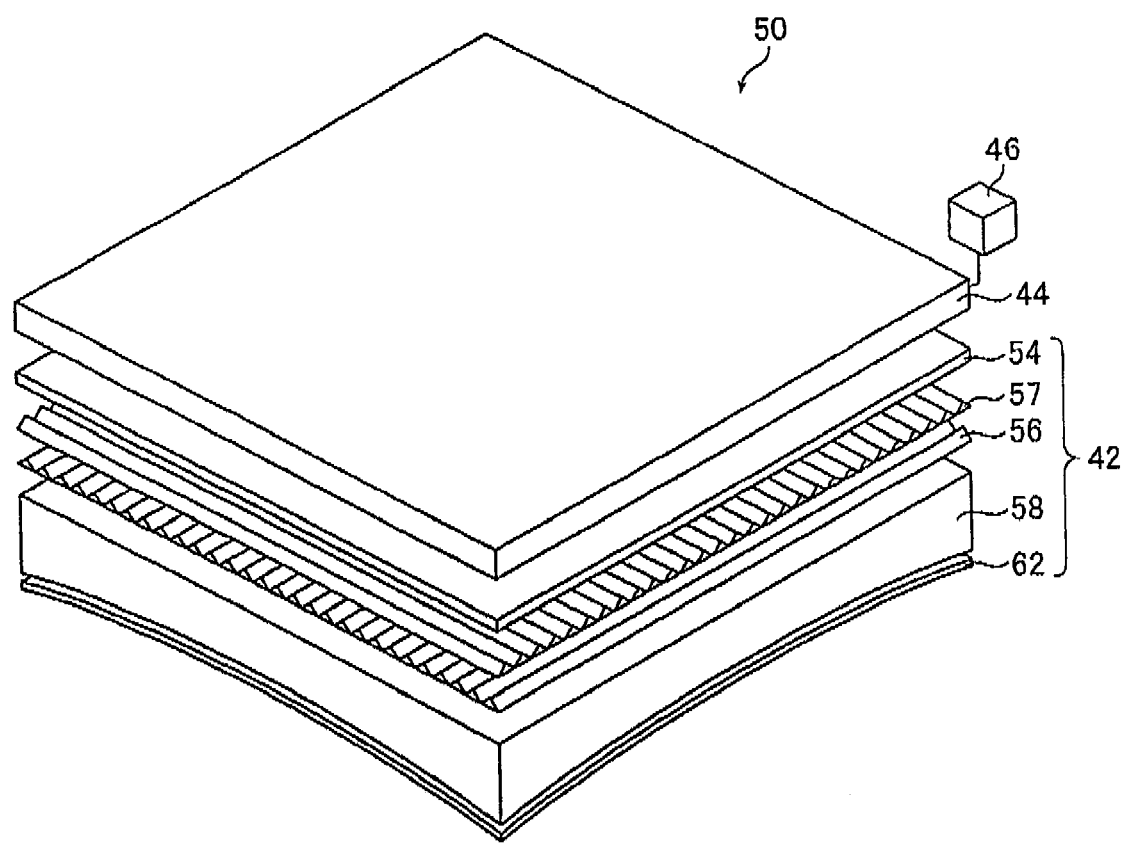
FIG. 10A is a schematic perspective view of an example of a liquid crystal display device which includes the planar lighting device of the present invention.
Figure 10B:
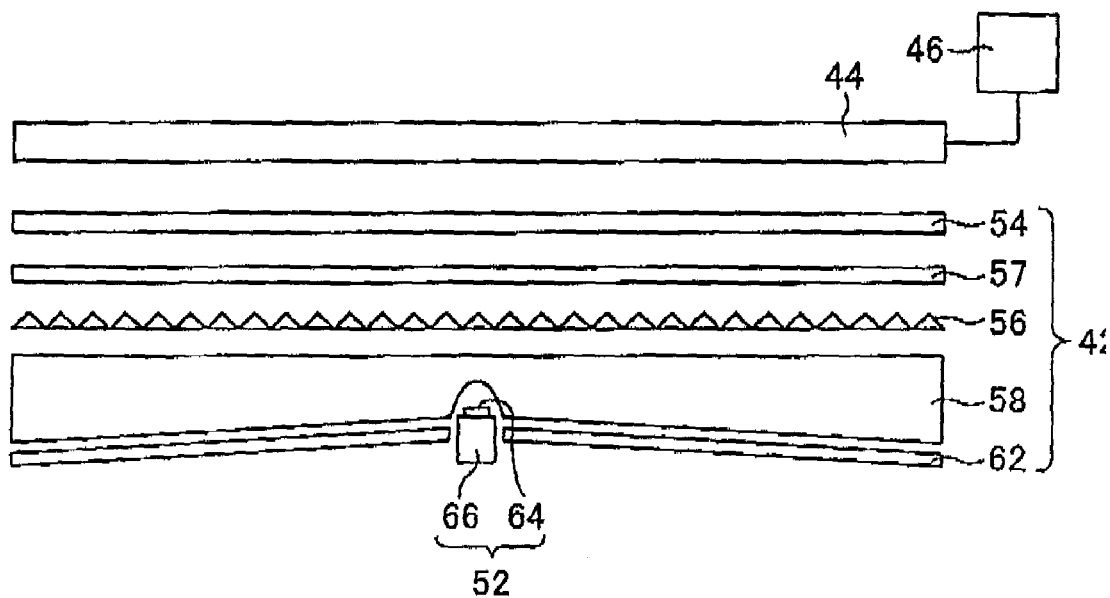
FIG. 10B is a schematic sectional view of the example of the liquid crystal display device which includes the planar lighting device of the present invention.

FIG. 10A is a schematic perspective view of a liquid crystal display device provided with the planar lighting device (hereinafter, referred to as backlight unit) according to the first embodiment in the second aspect of the present invention, and FIG. 10B is a schematic sectional view of the liquid crystal display device.

A liquid crystal display device 50 includes a backlight unit 42, a liquid crystal display panel 44 disposed on the side of the backlight unit closer to the light exit plane, and a drive unit 46 for driving the liquid crystal display panel 44.

In the liquid crystal display panel 44, electric field is partially applied to liquid crystal molecules previously arranged in a given direction to change the orientation of the molecules. The resultant changes in refractive index occurring in the liquid crystal cells are used to display characters, figures, images, etc., on a surface (screen) of the liquid crystal display panel 44.

The drive unit 46 applies a voltage to transparent electrodes included in the liquid crystal display panel 44 to change the orientation of the liquid crystal molecules, thereby controlling the transmittance of the light transmitted through the liquid crystal display panel 44.

The backlight unit 42 is a lighting device for irradiating the entire surface of the liquid crystal display panel 44 with light from behind the liquid crystal display panel 44 and includes a light exit plane having substantially a same shape as the image display surface of the liquid crystal display panel 44.

As illustrated in FIGS. 10A and 10B, the backlight unit 42 according to the first embodiment in the second aspect of the present invention includes a light source 52, a diffusion film 54, prism sheets 56 and 57, a light guide plate unit 58 serving as the unitary light guide plate as a light guide member, and a reflection sheet 62. Hereinafter, individual components forming the backlight unit 42 are described.

First, the light source 52 is described.

Figure 12:
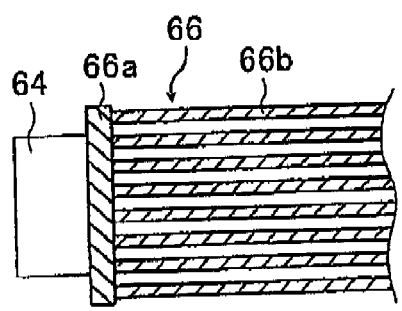
FIG. 12 is a schematic side view illustrating an example of a configuration of the LED array used by the present invention.

FIG. 12 is a schematic side view illustrating a configuration of the light source 52.

As illustrated in FIG. 12, the light source 12 includes an LED chip 64 and a heat sink 66, and as illustrated in FIG. 10B, is disposed in the light entrance portion 58*d* disposed in the backside 58*b* of the light guide plate 58 described below in detail.

The LED chip 64 is a monochromatic LED adapted to convert the light emitted by the LED into white light using a fluorescent substance. When a GaN base blue LED is used as a monochromatic LED, for example, white light can be obtained using yttrium aluminum garnet (YAG) base fluorescent substance.

As illustrated in FIG. 10B and FIG. 12, the heat sink 66 carries the LED chip 64, and is disposed so that the LED chip 64 is opposed to the light guide plate 58 in a direction perpendicular to the light exit plane 58*a* of the light guide plate 58. The heat sink 66 is formed of a metal having a good thermal conductivity, such as copper or aluminum to absorb and release heat generated by the LED chip 64 to the outside.

A length of the heat sink 66 in a direction perpendicular to the light exit plane 58*a* may be appropriately set so as to obtain cooling performance enough to cool the LED chip 64 in view of the amount of heat generated by the LED chip 64, cooling efficiency of the heat sink 66 determined by a material used for the heat sink 66 or a shape of the heat sink 66, and an influence on a thickness of the backlight unit 42.

Here, the heat sink 66 preferably has a large surface area. For example, the heat sink 66 may be formed of a base 66*a* carrying the LED chip 64 and a plurality of fins 66*b* joined to the base 66*a* as illustrated in FIG. 12.

The plurality of fins 66*b* provided secure a large surface area and a high heat dissipation efficiency, increasing the efficiency with which the LED chip 64 is cooled.

Further, the heat sink may be not only of air-cooled type but also of water-cooled type.

While this embodiment uses a heat sink as a support member for the LED chip, the present invention is not limited thereto: where the LED chip does not need to be cooled, a plate member without a heat-releasing function may be used as the support member.

In this case, preferably, the LED chip 64 of this embodiment is configured to have a substantially square shape and directivity that, regarding light from the LED chip 64, the amount of light advancing in a plane direction parallel to the light exit plane 58a of the light guide plate 58 is large while the amount of light advancing in an orthogonal direction is small.

Specifically, for the light source 52, a light source configured to guide light emitted from the LED chip 64 in the planar direction parallel to the light exit plane 58a of the light guide plate 58 by disposing a member such as a transparent resin having a light guiding effect or a scattering effect on the light exit plane side of the LED chip 64 or disposing a member having a reflection function between the LED chip 64 and the light guide plate 58 can be used. Thus, even in the case of the light source with the large light output of the LED chip 64, brightness unevenness where a brightness distribution of the backlight unit 42 is large near the light source 52 and gradually reduced as becoming farther from the light source 52 is prevented, so uniformity of a brightness distribution can be improved. The light source of a large light amount can be used, and hence the backlight unit can be enlarged.

For the LED chip, as a light source of low anisotropy in the plane direction parallel to the light exit plane 58a of the light guide plate 58 having a substantially square shape, a light source of a square shape is preferably used as in this embodiment. However, the present invention is not limited to this. LED chips of various shapes such as a rectangular shape, a polygonal shape, a circular shape, and an elliptic shape can be used.

Next, the light guide plate 58 of the backlight unit 42 is described.

Figure 11A:
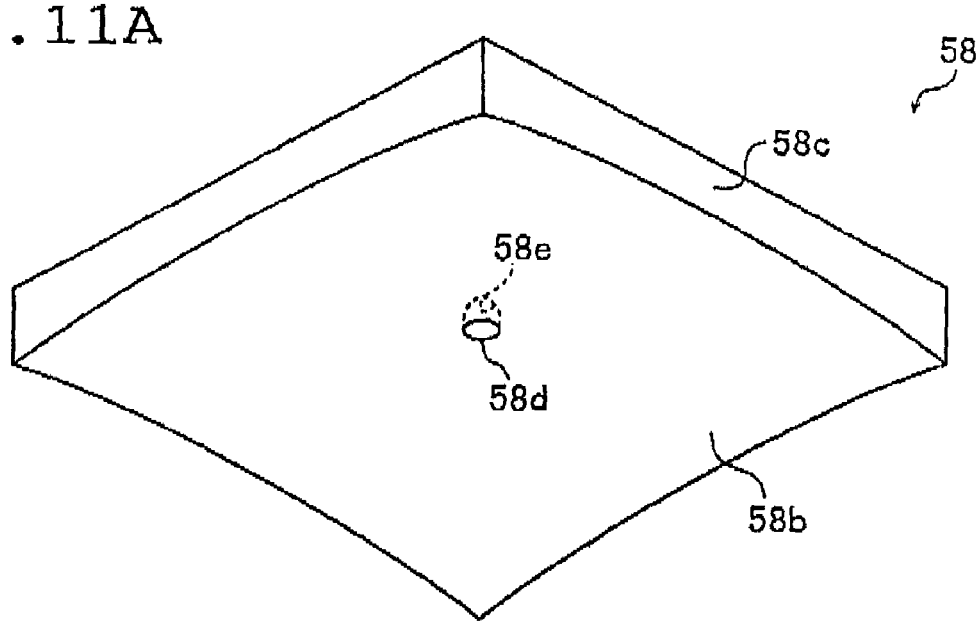
FIG. 11A is a schematic perspective view of an example of a unitary light guide plate used for the planar lighting device of the present invention.
Figure 11B:
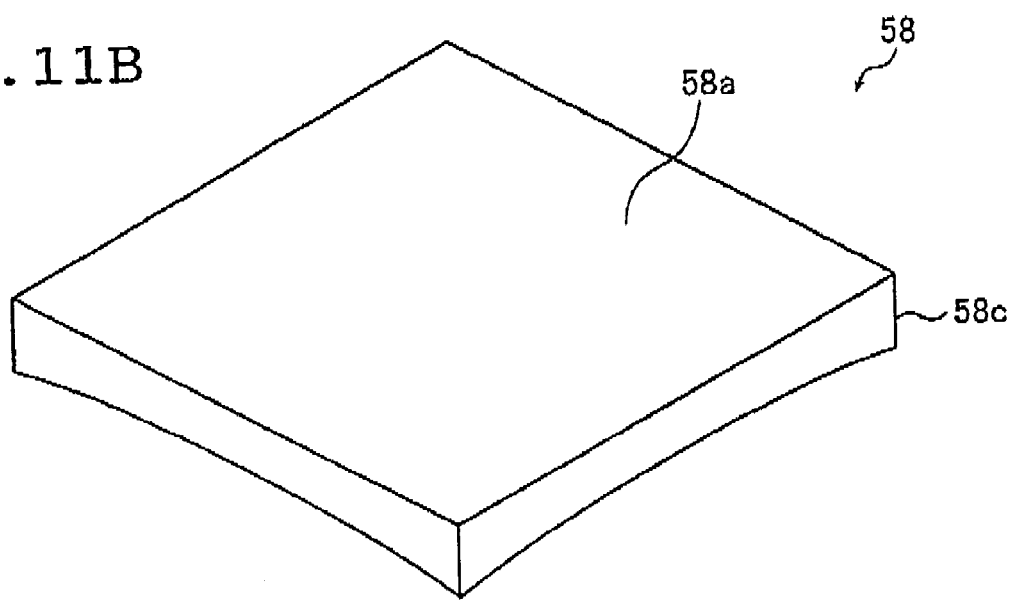
FIG. 11B is a schematic perspective view of the example of the unitary light guide plate used for the planar lighting device of the present invention.
Figure 11C:
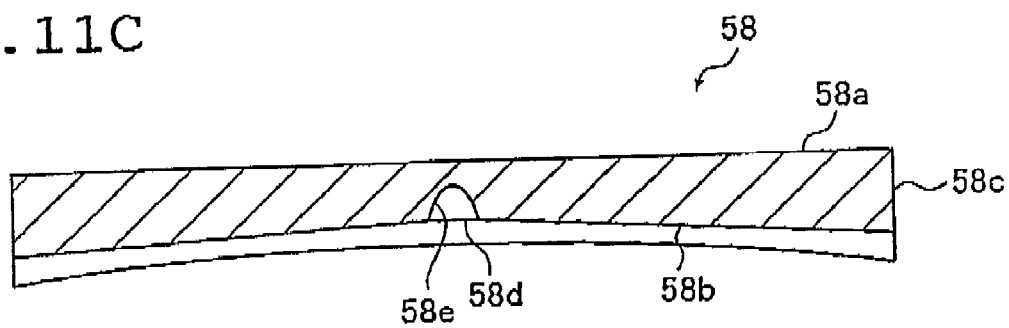
FIG. 11C is a schematic sectional view of the example of the unitary light guide plate used for the planar lighting device of the present invention.

FIGS. 11A and 11B are schematic perspective views of a light guide plate used for the backlight unit of the second aspect of the present invention, and FIG. 11C is a schematic sectional view of the light guide plate. FIG. 11C illustrates a section taken along a plane passed through the center of the light entrance portion 58d and perpendicular to the lateral plane 58c.

As illustrated in FIG. 11A, the light guide plate 58 includes a substantially square flat light exit plane 58a, a backside 58b opposed to the light exit plane 58a, and a lateral plane 58c coupled to the light exit plane 58a and the backside 58b. In the substantial center of the backside 58b, a light entrance portion 58d that is a concave portion for disposing the light source 52 is disposed. The light entrance plane 58d has its sectional shape formed by combining two hyperbolic curves, and its wall plane is a light entrance surface 58e for entering light from the light source 52 into the light guide plate 58.

In the light guide plate 58 of the second aspect of the present invention, as becoming farther from the light entrance portion 58d in a direction parallel to the light exit plane 58a, a thickness of the light guide plate 58 defined as a distance between the light exit plane 58a and the backside 58b becomes larger, and the thickness is largest at a position farthest from the light entrance portion, in other words, at corners of the substantially square light exit plane 58a. In the illustrated light guide plate 58, especially, the backside 58b inclines in tapered shape (conical plane shape) with respect to the light exit plane 58a. There is no particular limitation on an inclined angle of the backside 58b with respect to the light exit plane 58a.

In the light guide plate 58 illustrated in FIGS. 11A to 11C, the light emitted from the light entrance surface 58e is passed through the light guide plate 58 while being scattered by scatterers (described below in detail) contained in the light guide plate 58, reflected on the backside 58b, and then exits from the light exit plane 58a. In this case, a part of the light may leak from the backside 58b. However, the leaked light is reflected on the reflection sheet 62 (refer to FIGS. 10) disposed to cover the backside 58b of the light guide plate 58, and then enters the light guide plate 58 again.

Thus, according to the second aspect of the present invention, setting the plane facing the light exit plane 58a of the light guide plate 58 as the backside 58b, and shaping the light guide plate 58 to be gradually thicker as becoming farther from the light entrance surface 58e enables the light entered into the light guide plate 58 to reach far. The light guide plate can be thinner than that of a flat plate shape or a wedge shape. In other words, according to the present invention, in the light guide plate, the light emitted from the light source can reach far, and thinning and weight-reduction are enabled. In short, an incident angle is gradually made small in the case of full reflection, and a light is difficult to exit from the light exit plane to the outside. Hence, the incident light can reach a deeper side. As a result, the backlight unit can be made lightweight, thinned and enlarged.

As light emitting means for emitting light inside the light guide plate 58 through the light exit plane 58a to the outside, preferably, scatterers are contained in the light guide plate 58. By containing the scatterers to appropriately scatter the light, breaking a full-reflection condition, a function of emitting light difficult to exit is provided in the light guide plate 58 itself, and light emitted from the light exit plane 58a can be made more uniform.

As light emitting means, in addition to the scatterers, transmittance adjusters are added to at least one of the light exit plane 58a and the backside 58b of the light guide plate 58. By appropriately adjusting an arranging density of the transmittance adjusters, uniform light can be emitted as in the case of the scatterers.

As light emitting means, in addition to the scatterers, the use of such transmittance adjusters enables emission of more uniform light.

The light guide plate 58 preferably satisfies a relationship of $D_1<D_2$ and $1/1,000<(D_2-D_1)/L<1/10$, where $D_1$ denotes a thickness of the light guide plate in the abyss of the concave portion which is the light entrance portion 58d, $D_2$ denotes a thickness of the light guide plate at a position where a thickness of the light guide plate is maximum (at the corners of light exit plane 58a in the illustrated example), and L denotes a distance from the light entrance portion disposed in the center of the light guide plate to the position of the maximum thickness of the light guide plate. Forming the light guide plate into the shape satisfying the expression enables more preferable thinning, weight-reducing and enlarging of the light guide plate. As a result, the planar lighting device can be thinned, made lightweight, and enlarged.

The light guide plate unit 58 is formed of a transparent resin into which scattering particles for scattering light are kneaded and dispersed. As a transparent resin material that is used for the light guide plate unit 58, there are optically transparent resins such as polyethylene terephthalate (PET), polypropylene (PP), polycarbonate (PC), polymethyl methacrylate (PMMA), benzyl methacrylate, an MS resin, an acrylic resin, and cycloolefin polymer (COP). As the scattering particles kneaded and dispersed into the light guide plate unit 58, for example, TOSPEARL, silicone, silica, zirconia, or a dielectric polymer can be used. The light guide plate unit 58 containing such scattering particles is capable of emitting uniform illumination light through the light exit plane with a reduced level of brightness unevenness.

The light guide plate unit 58 as described above may be manufactured using various methods such as an extrusion molding method and an injection molding method.

Now, let Φ be the scattering cross section of the scattering particles contained in the light guide plate unit 58, L be the length ranging from a light incoming portion provided at the center of the light guide plate to a position where the thickness of the light guide plate is the greatest, $N_p$ be the density of the scattering particles contained in the light guide plate 58 (number of particles per unit volume), and $K_C$ be a compensation coefficient, the light guide plate is configured to satisfy a relationship that the value $\Phi \cdot N_p \cdot L \cdot K_C$ is 1.1 or more and 8.2 or less, and that the compensation coefficient $K_C$ is 0.005 or more and 0.1 or less. Accordingly, the light guide plate unit 58 is capable of emitting uniform illumination light through the light exit plane with a reduced level of brightness unevenness. The reason for this is described below.

When parallel light beams are caused to enter an isotropic medium, a transmittance T is generally expressed according to the Lambert-Beer law by the following Expression (1):

$$T=I/I_o=\exp(-\rho \cdot x) \quad (1)$$

where x is a distance, $I_o$ is an intensity of incident light, I is an intensity of outgoing light, and $\rho$ is an attenuation constant.

The above-mentioned attenuation constant $\rho$ is expressed using $\Phi$, the scattering cross section of the particles and $N_p$, the number of particles per unit volume contained in the medium by Expression (2) below:

$$\rho=\Phi \cdot N_p \quad (2)$$

Accordingly, when the length of the light guide plate in the direction of the optical axis is L, a light extraction efficiency $E_{out}$ is expressed by the following Expression (3).

$$E_{out} \propto \exp(-\Phi \cdot N_p \cdot L) \quad (3)$$

Expression (3) above applies to a space of limited dimensions, and in order to correct the relationship with Expression (1) above, the compensation coefficient $K_C$ is therein introduced. The compensation coefficient $K_C$ is a dimensionless compensation coefficient empirically obtained when light propagates through an optical medium of limited dimensions. The light extraction efficiency $E_{out}$ is then expressed by Expression (4) below.

$$E_{out}=\exp(-\Phi \cdot N_p \cdot L \cdot K_C) \quad (4)$$

According to Expression (4) above, when the value $\Phi \cdot N_p \cdot L \cdot K_C$ is 3.5, the light extraction efficiency $E_{out}$ is 3%, and when the value of $\Phi \cdot N_p \cdot L \cdot K_C$ is 4.7, the light extraction efficiency $E_{out}$ is 1%.

The results show that the light extraction efficiency $E_{out}$ decreases as the value $\Phi \cdot N_p \cdot L \cdot K_C$ increases. It is assumed that the light extraction efficiency $E_{out}$ thus decreases because light is scattered increasingly as the light travels in the direction of the optical axis of the light guide plate.

It follows, therefore, that, as the value $\Phi \cdot N_p \cdot L \cdot K_C$ becomes greater, the light extraction efficiency decreases, which provides preferable property as the light guide plate.

When the value $\Phi \cdot N_p \cdot L \cdot K_C$ is great, light emitted through the light exit plane can be increased. In other words, when the value $\Phi \cdot N_p \cdot L \cdot K_C$ is great, the light use efficiency which is the ratio of the light emitted through the light exit plane to the light that enters the light entrance plane can be increased. Specifically, a light use efficiency as high as 50% or more is achieved when the value $\Phi \cdot N_p \cdot L \cdot K_C$ is 1.1 or more.

While light emitted through the light exit plane of the light guide plate unit increasingly exhibits illuminance unevenness when the value $\Phi \cdot N_p \cdot L \cdot K_C$ is considerably great, the illuminance unevenness can be held to under a given level (within tolerable range) by holding the value $\Phi \cdot N_p \cdot L_G \cdot K_C$ to 8.2 or less.

Further, the value $\Phi \cdot N_p \cdot L \cdot K_C$ of the light guide plate according to the present invention preferably satisfies a relationship of 1.1 or more and 8.2 or less, and more preferably satisfies a relationship of 2.0 or more and 8.0 or less. Further, the value $\Phi \cdot N_p \cdot L \cdot K_C$ is still further preferably 3.0 or more, and most preferably 4.7 or more.

Further, the compensation coefficient $K_C$ is preferably 0.005 or more and 0.1 or less. The high light use efficiency is achieved when $K_C$ is 0.005 or more, and illuminance unevenness observed in light emitted from the light guide plate can be reduced when $K_C$ is 0.1 or less.

As described above, the scattering effect in the light guide plate 54 is associated with a scattering cross section (scattering energy per unit time) determined from particle diameters of the scattering particles contained in the light guide plate, a refractive index of the scattering particles, a size distribution of the scattering particles, and a refractive index of a material which is a base material of the light guide plate by Mie theory, a particle density of the scattering particles, and a light guiding distance from entrance.

In the light guide plate 58 of the illustrated example, the sectional shape of the light entrance portion 58*d* is a shape of two hyperbolic curves crossing each other. However, the shape is not limited to this.

A sectional shape of the light entrance portion may take a shape similar to that of the parallel groove of the first aspect.

Figure 7A:
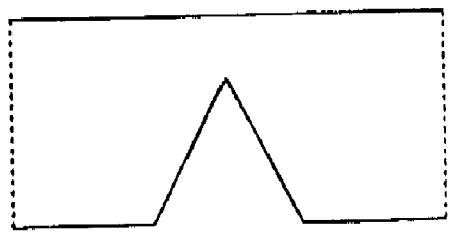
FIGS. 7A to 7D are conceptual views illustrating examples of sectional shapes of parallel grooves of the light guide plate unit of the present invention, and other embodiments of light entrance portions of the light guide plate.
Figure 7B:
Figure 7C:
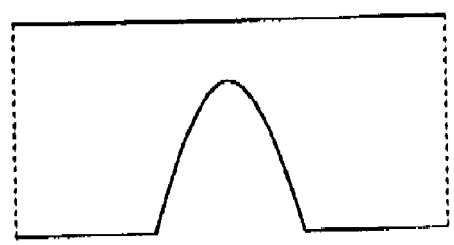
Figure 7D:
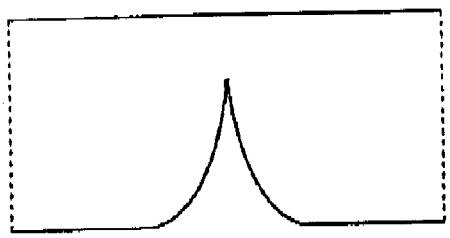

FIGS. 7A to 7E each illustrate another example of a sectional shape of the light entrance portion applicable to the light guide plate of the second aspect of the present invention. FIG. 7A illustrates a light entrance portion of a conical shape having a triangular section. FIG. 7B illustrates a light entrance portion where a vertex of the conical shape illustrated in FIG. 7A is formed to be a curve. FIG. 7C illustrates a light entrance portion having a parabolic section. FIG. 7D illustrates a light entrance portion having a sectional shape formed by two downward-convex quadratic curves (hyperbolic or parabolic curves) crossing each other. The light entrance portion of this example is conical. Thus, sections passed through the center of the light entrance portion and taken at arbitrary angles are all identical in shape.

For the shape of the light entrance plane, in addition to those of the illustrated example, a sectional shape may be U-shaped, and any shape is employed as long as uniform brightness effect can be obtained.

A shape of the light entrance portion may be appropriately determined, according to an incident angle of light emitted from the light source and entered to the light entrance plane which is a wall plane of the light entrance portion, or a refractive index of a material of the light guide plate, so that uniform illumination light of less brightness unevenness can be emitted from the light exit plane.

In the illustrated example, the light source 52 is disposed in the light entrance portion 58*d*. However, the present invention is not limited to this. A compact LED chip may be directly disposed in the light entrance surface 58*e* which is a wall plane of the light entrance portion 58*d*. Disposing the LED chip in this manner enables efficient entrance of light from the LED chip into the light guide plate. The generation of brightness unevenness where brightness in the light exit plane 58*a* directly above or near the light entrance portion 58*d* of the light guide plate 58 is large, and brightness is smaller as becoming farther from directly above the light entrance portion 58*d* can be prevented. As a result, an illumination light of a uniform brightness distribution can be obtained.

The light guide plate 58 includes the square-shaped light exit plane 58*a* as illustrated. However, the present invention is not limited to this.

Figure 13A:
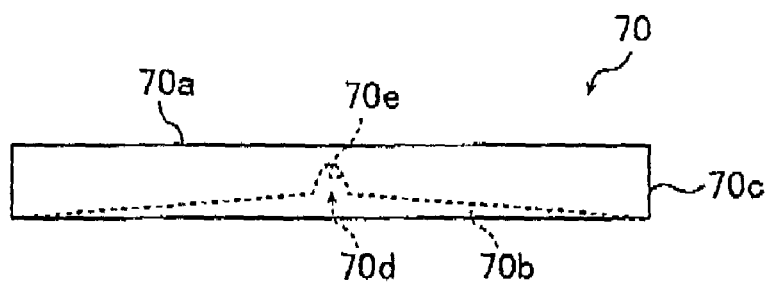
FIG. 13A is a schematic side view of another example of a unitary light guide plate used for the planar lighting device of the present invention.
Figure 13B:
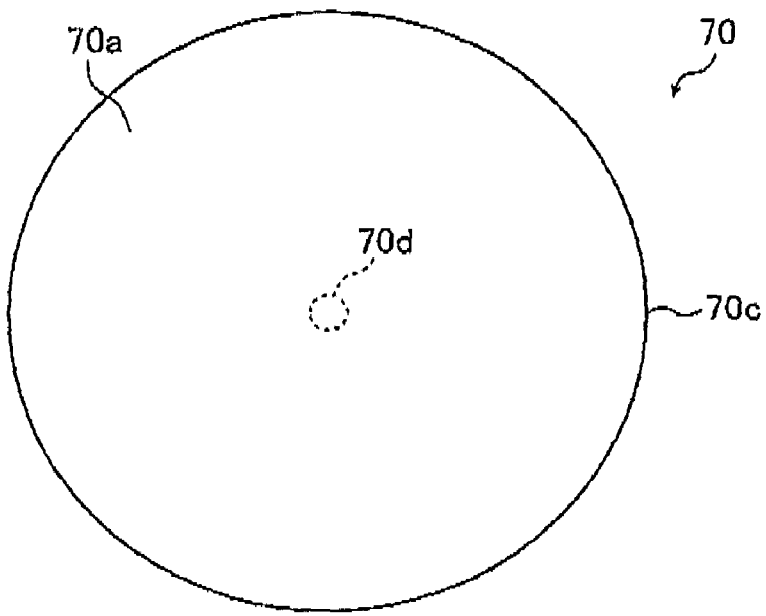
FIG. 13B is a schematic top view of the another example of the unitary light guide plate used for the planar lighting device of the present invention.
Figure 13C:
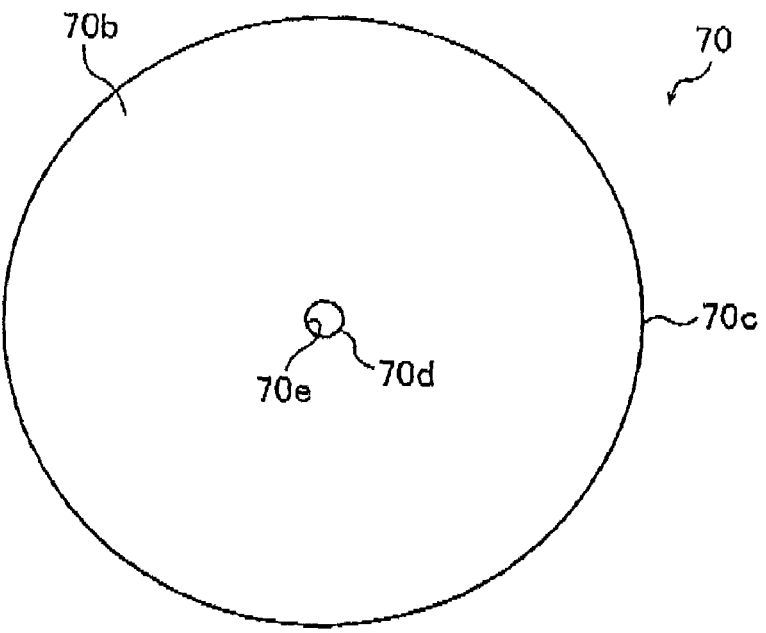
FIG. 13C is a schematic back view of the another example of the unitary light guide plate used for the planar lighting device of the present invention.

FIGS. 13A to 13C illustrate another example of a light guide plate of the second aspect of the present invention. A light guide plate 70 illustrated in FIGS. 13A to 13C includes a circular light exit plane 70a, a backside 70b opposed to the light exit plane 70a, a lateral plane 70c coupled to the light exit plane 70a and the backside 70b, and a light entrance portion 70d which is a concave portion disposed in the substantial center of the backside 70a to dispose a light source therein. The light guide plate 70 is thicker as becoming farther from the light entrance portion 70d in a direction parallel to the light exit plane 70a.

The light entrance portion 70d has a sectional shape where two hyperbolic curves are combined, and its wall plane constitutes a light entrance plane 70e for entering light from the light source into the light guide plate 70.

Other structures of this disk-shaped light guide plate 70 are similar to those of the above-mentioned square light guide plate 58, and thus additional detailed description thereof is omitted.

In the light guide plate of the second aspect of the present invention, the shape of the light exit plane (in other words, shape of light guide plate) is not limited to the square shape illustrated in FIGS. 11A to 11C, or the circular shape illustrated in FIGS. 13A to 13C. A regular polygonal shape such as a regular hexagonal shape can be suitably used. In the light guide plate of the second aspect of the present invention, light from the light source can be made an illumination light of a uniform brightness distribution by using a light guide plate of a regular polygonal shape or a circular shape.

The light guide plate of the second aspect of the present invention is not limited to the regular polygonal shape or the circular shape. Any shape can be employed as long as a thickness of the light guide plate is larger as becoming farther from the light entrance portion. There is accordingly no particular limitation on a shape of the light exit plane by taking a shape as described above. In other words, the light guide plate of the present invention enables selection of a shape of its light exit plane with high freedom.

In the illustrated example, the light guide plate includes the backside inclined with respect to the flat light exit plane. However, the light guide plate of the second aspect of the present invention is not limited to this. The light guide plate only needs to be formed such that its thickness is larger as becoming farther from the light entrance portion.

For example, the light guide plate may be configured by disposing an inclined portion in the light exit plane with respect to the flat backside. The light guide plate may be configured by disposing inclined portions in both of the light exit plane and the backside. The inclined portion disposed in the light exit plane and/or the backside may have a curved section.

Next, the diffusion film 54 is described.

As illustrated in FIGS. 10A and 10B, the diffusion film 54 is disposed between the prism sheet 57 and the liquid crystal display panel 44. The diffusion film 54 is formed by imparting a light diffusing property to a material in the form of film. The material in the form of film may be formed, for example, of an optically transparent resin such as polyethylene terephthalate (PET), polypropylene (PP), polycarbonate (PC), polymethyl methacrylate (PMMA), benzyl methacrylate, MS resins, an acrylic resin, and cycloolefin polymer (COP).

The method of manufacturing the diffusion film 54 is not limited specifically. For example, a surface of the material in the form of film may be machined to form an asperity thereon or roughened by grinding thereby to provide a light diffusing property, or by coating the surface with a material for diffusing light as exemplified by silica, pigments such as titanium oxide and zinc oxide, a resin, and beads of glass, zirconia, etc., together with a binder, or by kneading the above-mentioned pigments or beads that diffuse light into the transparent resin. Otherwise, one may also use a material having a high reflectance and a low light-absorbing property such as metals as exemplified by Ag and Al.

In the second aspect of the present invention, a diffusion film of a matte type or a coating type may be used as the diffusion film 54.

The diffusion film 54 may be disposed a given distance apart from the light exit plane 58a of the light guide plate 58. The distance may be altered as appropriate according to the light amount distribution of light emitted through the light exit plane 58a of the light guide plate 58.

With the diffusion film 54 spaced a given distance apart from the light exit plane 58a of the light guide plate 58, the light emitted through the light exit plane 58a of the light guide plate 58 is further mixed (blended) between the light exit plane 58a and the diffusion film 54. This further enhances the uniformity of brightness of the light transmitted through the diffusion film 54 to illuminate the liquid crystal display panel 44.

As the method of spacing the diffusion film 54, a given distance apart from the light exit plane 58a of the light guide plate 58, there can be employed a method of, for example, providing spacers between the diffusion film 54 and the light guide plate 58.

The prism sheets 56 and 57 are transparent sheets formed with a plurality of prisms arranged parallel to one another and help condense light emitted through the light exit plane 58a of the light guide plate 58 to improve brightness. One of the prism sheets 56 and 57 is disposed so that the prism arrays thereof extend in parallel to one side of the light exit plane 58a of the light guide plate 58 and the other is disposed with the prism arrays extending perpendicularly thereto. In other words, the prism sheets 56 and 57 are disposed so that their respective prism arrays extend perpendicularly to each other. Further, the prism sheet 56 is disposed so that the vertex angles of the prisms face the diffusion sheet 54, that is, so that the bottom surfaces of the prisms face the light exit plane 58a of the light guide plate 58. The order in which the prism sheets 56 and 57 are disposed is not particularly limited, and the prism sheet 56 may be disposed immediately on the light guide plate while disposing on the prism sheet 56 the prism sheet 57, or the order may be reversed.

The backlight unit 42 illustrated in FIGS. 10A and 10B comprises the two prism sheets. However, the backlight unit 42 can comprise one prism sheet.

The prism sheet including prism arrays is disposed on the light exit plane 58a. However, similar effects can be obtained when prism arrays are formed in the backside 58b of the light guide plate 58. In other words, forming the prism arrays in the backside enables improvement of brightness by enhancing condensing performance of a light emitted from the light exit plane 58a.

In the illustrated example, the prism sheet is used. However, in place of the prism sheet, a sheet having regularly arranged optical elements similar to prisms may be used. A sheet having regularly arranged elements having lens effects, for example, optical elements such as lenticular lenses, concave lenses, convex lenses or pyramid-type optical elements can be used in place of the prism sheet. Such optical elements having lens effects can be formed in the backside of the light guide plate.

Next, the reflection sheet 62 of the backlight unit is described.

The reflection sheet 62 is provided to reflect light leaking through the backside 58b and the plane opposite to the light entrance plane 58c of the light guide plate 58 back into the light guide plate 58, thereby enhancing the light use efficiency. The reflection sheet 62 is so formed as to cover the backside 58*b* of the light guide plate 58. Further, the reflection sheet 62 is provided with a notch for disposing the light source 52 at a position corresponding to the light entrance portion 58*d* of the light guide plate 58.

The reflection sheet 62 may be formed of any material that is capable of reflecting light leaking through the backside 58*b* of the light guide plate 58. It may be formed, for example, of a resin sheet formed by kneading PET, polypropylene (PP), etc. with a filler and then drawing a resultant mixture to form voids therein, thereby to increase the reflectance, a sheet formed by depositing aluminum vapor or otherwise forming a specular surface on the surface of a transparent resin sheet or a white resin sheet, a metal foil such as an aluminum foil or a resin sheet carrying a metal foil, and a metal thin plate having sufficient reflective property on the surface.

The reflection sheet 62 of this embodiment is disposed only at the position facing the backside 58*b* of the light guide plate 58. Not limited to this, however, the reflection sheet 62 may be disposed to cover the lateral plane 58*c* of the light guide plate 58. Thus, the reflection sheet 62 can reflect light leaked from the lateral plane 58*c* of the light guide plate 58 to enter it to the light guide plate 58 again, thereby increasing light use efficiency.

The reflection sheet 62 of this embodiment includes the notch for disposing the light source 52 in the light entrance portion 58*d* of the light guide plate 58. Preferably, however, the reflection sheet 62 is configured in a manner of preventing generation of a space between the notch and the light source 52 to cause leakage of light from the space. For example, to prevent generation of a space, the notch may be formed according to an outer shape of the light source 52. A reflection member may be disposed in a space generated between the notch and the light source 52.

Each component of the backlight unit 42 of the first embodiment of the second aspect of the present invention has been described in detail. However, the present invention is not limited to this.

In the backlight unit 42 illustrated in FIGS. 10 and 11, the light source 52 is disposed in the light entrance portion 58*d* which is the concave portion disposed in the light guide plate 58. Not limited to this, however, the LED chip 64 of the light source 52 may be directly embedded in the light guide plate.

For example, the light entrance portion of the light guide plate may be filled with a transparent resin member, and a light source may be embedded in this transparent resin member. In this case, preferably, the resin member filling the light entrance portion has a refractive index lower than that of the light guide plate. Thus, Fresnel loss of light incoming to the light entrance plane of the light entrance portion can be reduced to increase the light admission efficiency.

Figure 14:
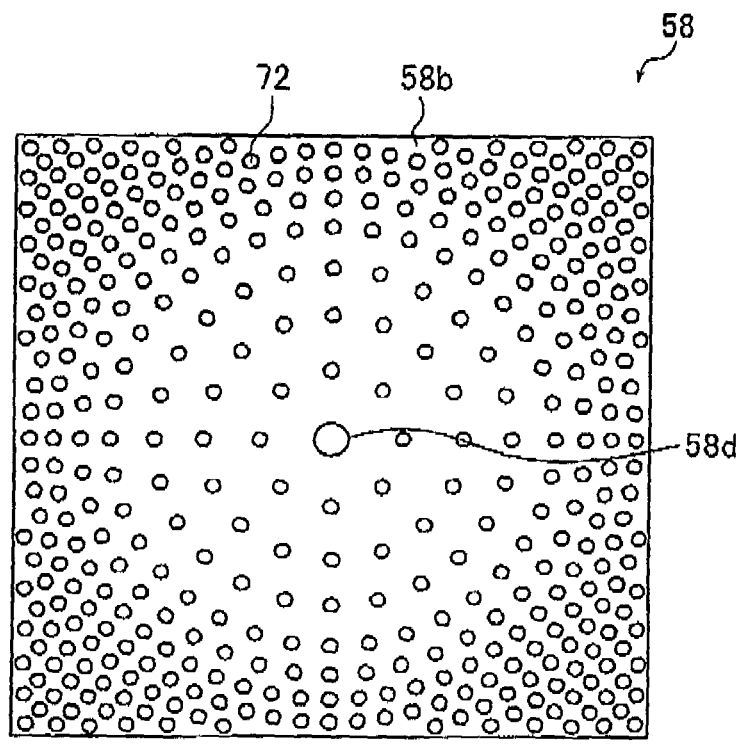
FIG. 14 is a schematic back view illustrating a unitary light guide plate which includes diffusion reflectors printed on the backside thereof.

For example, as illustrated in FIG. 14, a plurality of diffusion reflectors 72 may be formed, by printing for example, on the backside 58*b* of the light guide plate 58 in a given pattern, specifically in such a pattern that the density is low on the side of the light guide plate unit 58 closer to the light entrance portion 58*d*, growing gradually higher from the light entrance portion 58*d* toward the lateral plane 58*c*. Such diffusion reflectors 72 formed on the backside 58*b* of the light guide plate 58 in a given pattern limit generation of bright lines or unevenness in the light exit plane 58*a* of the light guide plate 58. Further, instead of printing the diffusion reflectors 72 on the backside 58*b* of the light guide plate 58, a thin sheet including the diffusion reflectors 72 formed thereon in a given pattern may be disposed between the backside 58*b* of the light guide plate 58 and the reflection sheet 62. It should be noted that the diffusion reflectors 72 may each have an arbitrary shape such as a rectangle, a polygon, a circle, and an ellipse.

The diffusion reflectors may be formed, for example, by applying a material for scattering light as exemplified by silica, pigments such as titanium oxide and zinc oxide, a resin, and beads of glass, zirconia, etc., together with a binder, or may be a pattern created by machining the surface to form an asperity thereon or by grinding to roughen the surface. Otherwise, a material having a high reflectance and a low light-absorbing property such as metals as exemplified by Ag and Al may be used. As diffusion reflectors, ordinary white ink as used in screen printing, offset printing, etc. may be used. For example, ink obtained by dispersing titanium oxide, zinc oxide, zinc sulfate, barium sulfate, or the like into acrylic binder, polyester binder, vinyl chloride binder, or the like, or ink given a diffusing property by mixing titanium oxide with silica may be used.

While the diffusion reflectors are distributed at a density that increases with the increasing distance from the light entrance plane in this embodiment, the second aspect of the present invention is not limited thereto and may be determined as appropriate according to the intensity or distribution of bright lines, brightness distribution required of outgoing light, etc. The diffusion reflectors, for example, may be distributed evenly on the entire surface of the backside or at a density that decreases with the increasing distance from the light entrance plane. Further, instead of forming the diffusion reflectors by printing, the locations corresponding to the diffusion reflectors may be roughened to provide sand-rubbed surfaces.

While the diffusion reflectors are provided on the backside in the light guide plate of FIG. 14, the present invention is not limited thereto, and the diffusion reflectors may be provided on an arbitrary plane as desired other than the light entrance plane. For example, the diffusion reflectors may be provided on the light exit plane or on the backside and the lateral plane.

Each of the embodiments has been described by way of a case where the number of light guide plates is one. However, the second aspect of the present invention is not limited to this. A plurality of light guide plates can be used for one planar lighting device.

Figure 15:
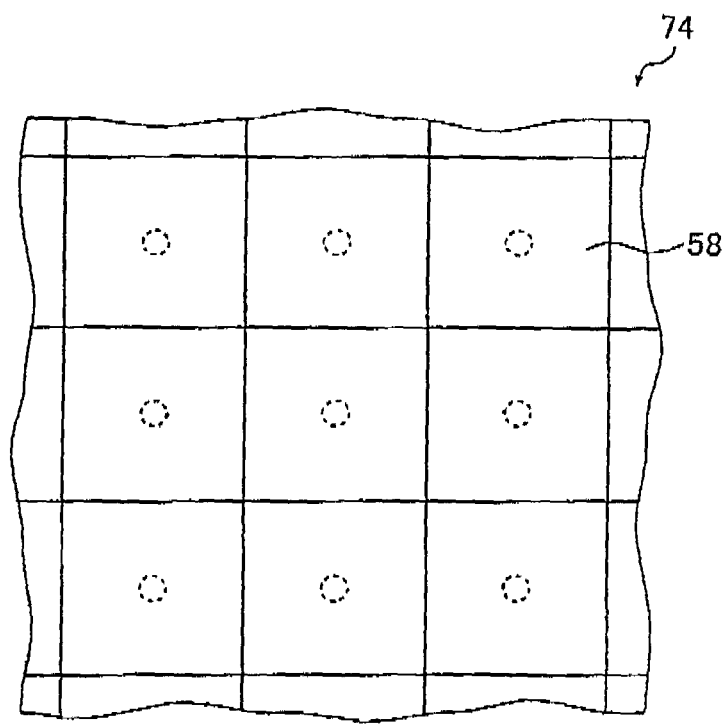
FIG. 15 is a schematic top view illustrating a light guide plate complex formed by combining a plurality of sets of unitary light guide plates illustrated in FIGS. 11.

FIG. 15 illustrates an example of a light guide plate complex 74 formed by using a plurality of light guide plates.

In the light guide plate complex 74, a plurality of light guide plates 58 are arranged in parallel to be planar, and light exit planes 58*a* thereof are arranged on the same plane to constitute one light exit plane.

Specifically, the plurality of light guide plates 58 having square light exit planes 58*a* are arranged in parallel so that lateral planes 58*c* of the adjacent light guide plates 58 can match each other.

In the light guide plate complex 74 of the illustrated example formed by using the light guide plates of identical shapes, in each coupled portion of the lateral planes of the light guide plates, the light guide plates match each other in thickness. Thus, in the backside of the light guide plate complex 74, the light guide plates 58 are smoothly coupled together without generating any steps in the coupled portion. As a result, brightness unevenness is prevented in the coupled portion, the planar lighting device can be enlarged, and a uniform illumination light of no brightness unevenness can be obtained. Preferably, the light guide plates are arranged without any space in the coupled portion, and adhered together.

The light exit plane thus formed by the plurality of light guide plates is covered, as in the case of the backlight unit 42 illustrated in FIGS. 10, with a diffusion film and prism sheets, whereby a planar lighting device of a large area can be realized. Thus, the planar lighting device can be used as a backlight unit for a larger liquid crystal display device.

Figure 16:
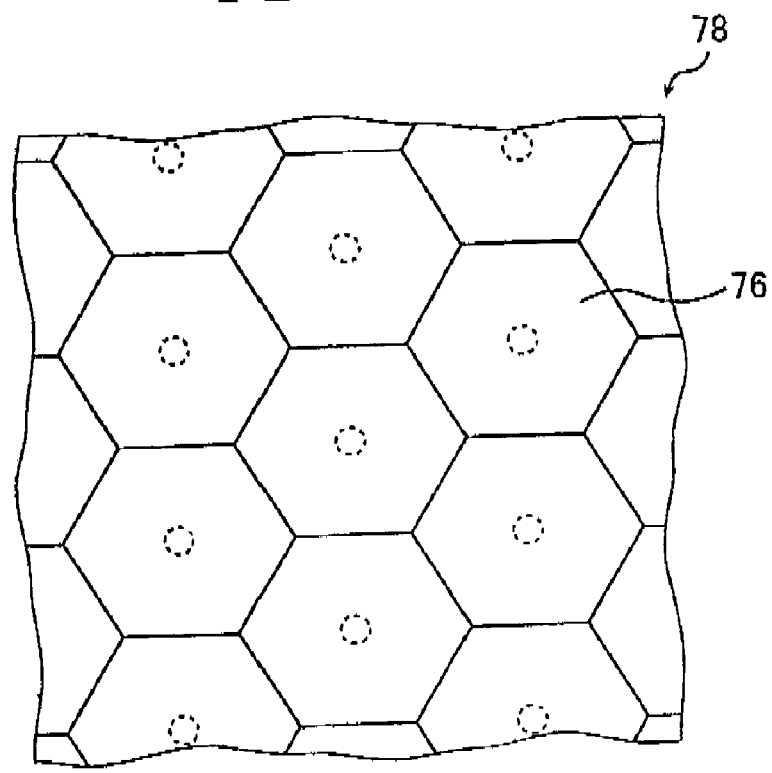
FIG. 16 is a schematic top view illustrating another example of a light guide plate complex used for the planar lighting device of the present invention.

In the light guide plate complex 74 illustrated in FIG. 15, the plurality of light guide plates having square light exit planes are arranged to be planar. However, the second aspect of the present invention is not limited to this. FIG. 16 illustrates a light guide plate complex 78 formed by arranging a plurality of light guide plates 76 having hexagonal light exit planes to be planar.

As in the case of the light guide plate 58 illustrated in FIGS. 11, the light guide plate 76 includes a light exit plane, a backside opposed to the light exit plane, a lateral plane coupled to the light exit plane and the backside, and a light entrance portion disposed in the substantial center of the backside to dispose a light source therein, and is configured such that its thickness can be larger as becoming farther from the light entrance portion.

The light guide plate complex 78 is formed by arranging the plurality of light guide plates 76 to be planar so that lateral planes of the adjacent light guide plates 76 can match each other. The light guide plate complex 78 is basically similar to the light guide plate complex 74 except for shapes of the light exit planes of the light guide plates. Thus, additional detailed description is omitted.

As illustrated in FIGS. 15 and 16, arranging the plurality of light guide plates where the light exit planes have symmetrical shapes such as square or hexagonal shapes in parallel to be planar enables easy formation of a light guide plate complex having one light exit plane. Configuring a planar lighting device by using this enables easy enlargement of the planar lighting device, and obtaining of an illumination light of a uniform brightness distribution.

In the planar lighting device using the light guide plate complex 78 illustrated in FIG. 16, the light guide plate complex 78 is formed by combining the plurality of light guide plates 76 having hexagonal light exit planes. Accordingly, light sources are arranged at equal intervals in a plane parallel to the light exit plane of the light guide plate complex 78. As a result, the planar lighting device can be enlarged, and an illumination light having a more uniform brightness distribution can be obtained.

Forming the hexagonal shape relatively similar to a circular shape enables arrangement of the light guide plates without any spaces. In the coupled portion of the light guide plates, a difference in thickness between a vertex of the hexagon where a thickness is maximum and a middle point between the adjacent vertexes can be reduced, and the backside of the light guide plate complex can be formed flatter. Thus, uniformity of a brightness distribution of illumination light can be improved.

In the second aspect of the present invention, the shape of the light exit plane of the light guide plate constituting the light guide plate complex is not limited to the hexagonal or square shape. The light exit plane may be circular as illustrated in FIGS. 13, or asymmetrical.

When the circular light guide plates 70 are arranged in parallel, by densely arranging them to have a same plane, as in the case of the hexagonal light guide plates, light sources can be arranged at equal intervals.

Figure 17A:
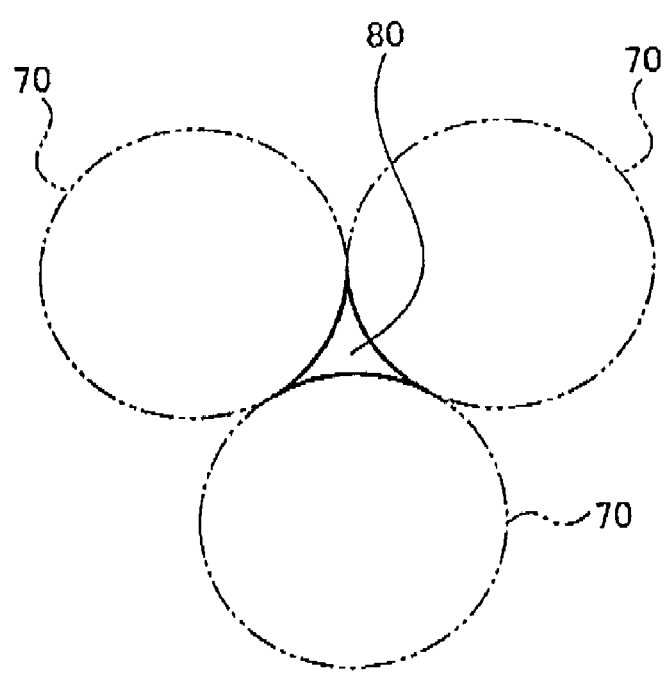
FIG. 17A is a schematic top view illustrating an example of a light guide plate disposed in a space generated in the light guide plate complex of the present invention.
Figure 17B:
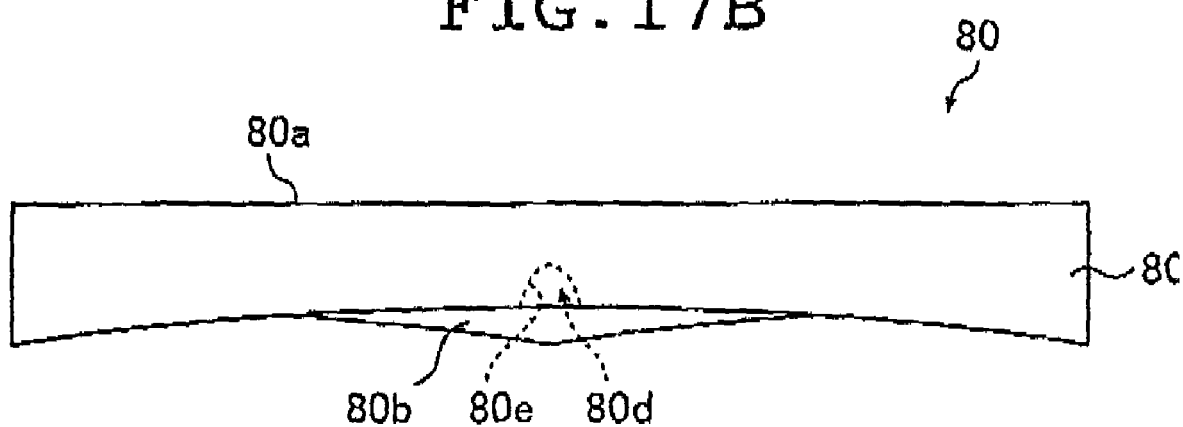
FIG. 17B is a schematic side view illustrating the example of the light guide plate disposed in the space generated in the light guide plate complex of the present invention.

When the circular light guide plates 70 are arranged in parallel, for example, a space is generated among the light guide plates. FIGS. 17A and 17B illustrate a light guide plate 80 disposed in such a space. The light guide plate 80 has, as illustrated in FIG. 17A, an outer shape substantially similar to a space generated among the circular light guide plates 70 constituting the light guide plate complex. As illustrated in FIG. 17B, as in the case of the light guide plate 58 and the like, the light guide plate 80 includes a light entrance portion 80d for disposing a light source on a backside 80b, and is formed to be thicker as becoming farther from the light entrance portion 80d. Such a light guide plate 80 is disposed in the space among the circular light guide plates 70. A light source (not shown) is disposed in the light entrance portion 80d of the light guide plate 80. Preferably, a reflection sheet (not shown) is disposed to cover the backside 80b. Thus, brightness unevenness caused by the space generated among the light guide plates 70 can be reduced. In this case, a shape of the backside 80b of the light guide plate 80 may be determined so as to smoothly match the coupled portions of the light guide plate 80 and the light guide plate 70 without any steps. The light guide plate 80 is basically similar to the light guide plate 58 except for an outer shape thereof, and thus detailed description thereof is omitted.

The light guide plate 80 is disposed in the space generated among the light guide plates 70. As another example, the space can be filled with a transparent resin or a resin containing scatterers. Thus, brightness unevenness caused by the space can be reduced.

As yet another example, a reflection member can be disposed in the space. The reflection member is arranged in a manner of directing its reflection plane to the light exit plane side of the light guide plate and covering the space from the backside of the light guide plate 70. The reflection member may be a flat member having a projected shape in a direction perpendicular to the light exit plane 70a, or a member having its reflection plane inclined toward the center of the space, for example, a conical shape. Disposing such a reflection member enables reduction of brightness unevenness caused by the space.

In the illustrated example, the plurality of light guide plates are arranged in parallel on the same plane. However, the second aspect of the present invention is not limited to this. A plurality of light guide plates can be arranged on a spherical or cylindrical curved plane, thereby curving the light exit plane of the light guide plate complex. Thus, for example, when a planar lighting device using this light guide plate complex is used as a display plate for illumination, it can be fixed to a wall having a curvature, and the light guide plates can be used for illuminations or POP (POP advertisements) of more types or in a wider use range.

Here, in manufacturing the light guide plate, a plasticizer may be mixed into the transparent resin. The light guide plate made of a transparent material mixed with a plasticizer is given flexibility, or pliability so that the light guide plate can be formed into various shapes. Thus, the surface of the light guide plate can be formed into various curved planes.

The use of such light guide plates enables, as described above, smoother curving of light exit planes of light guide plate complexes when the light guide plate complexes are arranged in parallel to be curved.

The plasticizer is exemplified by phthalic acid esters, or, specifically, dimethyl phthalate (DMP), diethyl phthalate (DEP), dibutyl phthalate (DBP), di(2-ethylhexyl) phthalate (DOP (DEHP)), di-n-octyl phthalate (DnOP), diisononyl phthalate (DINP), dinonyl phthalate (DNP), diisodecyl phthalate (DIDP), phthalate mixed-base ester ($C_6$ to $C_{11}$) (610P, 711P, etc.), and butyl benzyl phthalate (BBP). Other than phthalic acid esters, the plasticizer is also exemplified by dioctyl adipate (DOA), diisononyl adipate (DINA), dinormal alkyl adipate ($C_{6, 8, 10}$) (610A), dialkyl adipate ($C_{7, 9}$) (79A), dioctyl azelate (DOZ), dibutyl sebacate (DBS), dioctyl sebacate (DOS), tricresyl phosphate (TCP), tributyl acetylcitrate (ATBC), epoxidized soybean oil (ESBO), trioctyl trimellitate (TOTM), polyesters, and chlorinated paraffins.

In the illustrated example, the light guide plate complex is formed by arranging the plurality of light guide plates without any spaces. Not limited to this, however, for example, light guide plates may be appropriately arranged so that a light exit plane of the light guide plate complex can be annular.

In the illustrated example, the light guide plate complex is formed by using light guide plates of only one type. Not limited to this, however, the light guide plate complex may be formed by combining light guide plates having light exit planes of different shapes (for example, combining those of pentagonal and hexagonal shapes). Thus, shape of the light guide plate complex can be selected freely, and a shape of the planar lighting device can be selected freely.

The planar lighting device of the second aspect of the present invention has been described in detail. However, the second aspect of the present invention is not limited to the above-mentioned embodiment. Various improvements and changes can be made without departing from the spirit and the scope of the present invention.

For example, in the embodiment described above, the LED that emits white light is used. However, the present invention is not limited to this. For example, white light can be obtained by using three-color LEDs of red, green and blue, and mixing light emitted from the LEDs via a coupling lens.

Figure 18A:
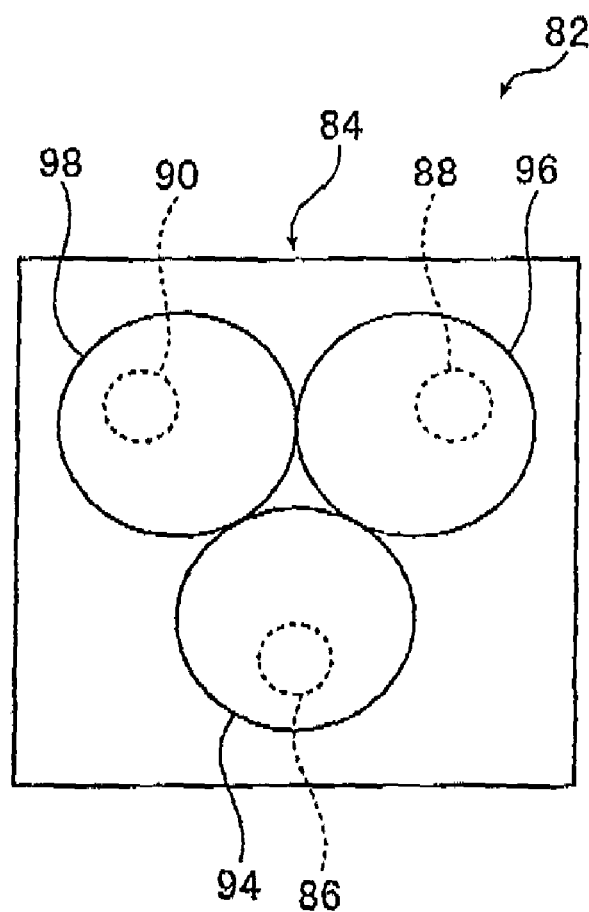
FIG. 18A is a schematic view of an RGB-LED and a coupling lens.
Figure 18B:
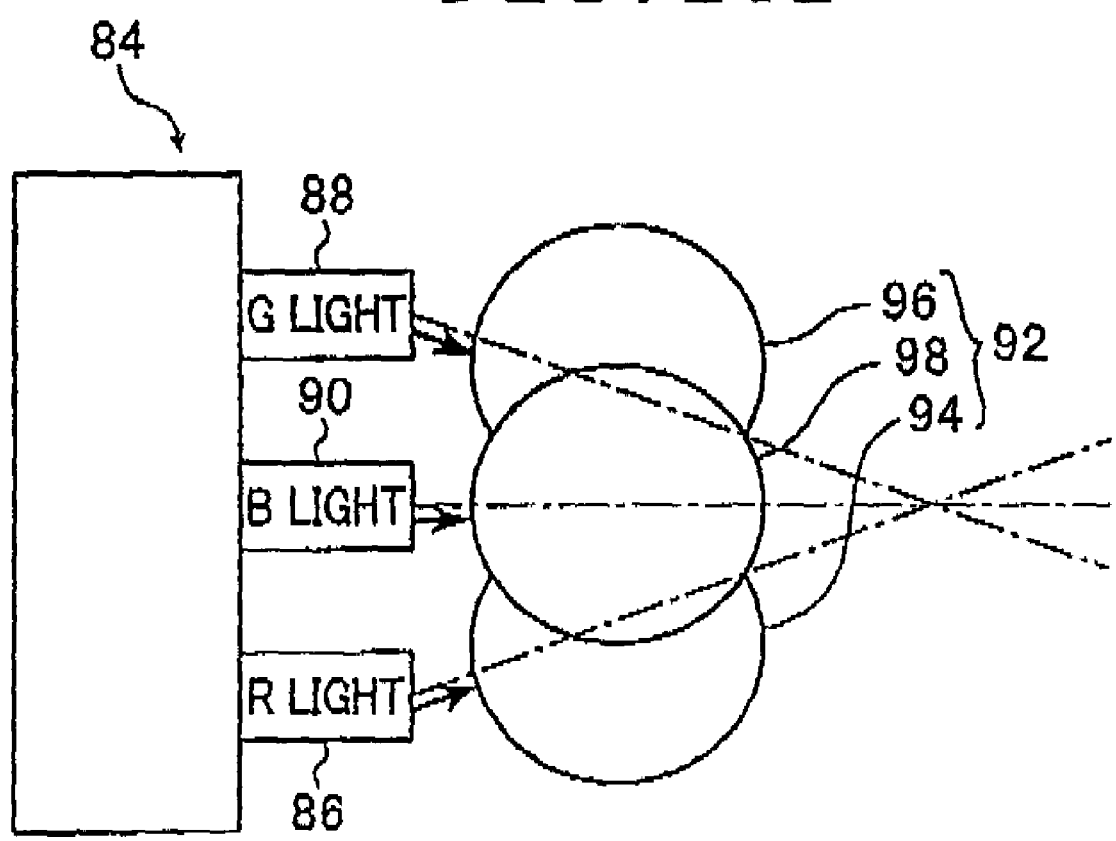
FIG. 18B is a schematic view of the RGB-LED and the coupling lens.

An example of a light source using LEDs of three colors is described below. FIGS. 18A and 18B are schematic configuration views of a light source using LEDs of three colors.

A light source 82 includes an RGB-LED 84 and a coupling lens 92. The RGB-LED 84 is formed by using three types of light emitting diodes of red (R), green (G), and blue (B) (hereinafter, respectively referred to as R-LED 86, G-LED 88, and B-LED 90). FIG. 18A schematically illustrates a situation of arranging the RGB-LED 84. As illustrated, the R-LED 86, the G-LED 88, and B-LED 90 are regularly arranged.

In each RGB-LED 84, the directions of the optical axes of the three kinds of LEDs (R-LED 86, G-LED 88, and B-LED 90) are adjusted as illustrated in FIG. 18B so that light beams emitted from the R-LED 86, the G-LED 88, and the B-LED 90 cross one another at a given position. Thus, the three kinds of LEDs are adjusted so that the light beams of the LEDs are mixed with each other to become white light.

The RGB-LED 84 configured using LEDs representing three primary colors (R-LED 86, G-LED 88, and B-LED 90) achieves a wide range of color reproduction and a high color purity as compared with cold cathode tubes (CCFL) conventionally used as a light source for a backlight. Therefore, when the RGB-LED 84 is used as a light source for a backlight, color reproduction is improved compared with the conventional case and images can be displayed in vivid color representation.

As illustrated in FIGS. 18A and 18B, three ball lenses 94, 96, and 98 are arranged as the coupling lens 92 on light exit sides of the LEDs of the RGB-LED 84. The ball lenses 94, 96 and 98 are arranged corresponding to the LEDs. In other words, for one RGB-LED 84, the three ball lenses 94, 96 and 98 are combined to be used. Light beams emitted from the LEDs (R-LED 86, G-LED 88, and B-LED 90) are converted into parallel light beams via the ball lenses 94, 96 and 98. Then, the parallel light beams cross each other at a predetermined position to form white light, and then the white light enters the light entrance surface 58e of the light guide plate 58. The coupling lens used by combining the three ball lenses 94, 96 and 98 is a lens having three axes, and can converge the light beams of the LEDs of the RGB-LED on one point to mix them.

While ball lenses are used as coupling lenses here, no specific limitations are placed on the coupling lenses, provided that they are capable of collimating light emitted by the LEDs. For example, a cylindrical lens, a lenticular lens, a half-cylindrical lens, a Fresnel lens, and the like can also be used.

Instead of providing the light source 52 including the LED chip 64 to the light entrance portion 58d of the light guide plate unit 58, light guides may be used to lead light emitted by the light source. The light guides may be formed of, for example, optical fibers or light guide paths made of a transparent resin.

When the LED is used as a light source and the LED is located at the light entrance portion 58d of the light guide plate 58, there is a fear that heat generated by the LEDs may deform or melt the light guide plate 58. Thus, deformation and melting of the light guide plate 58 due to the heat generated by the LEDs can be prevented by locating the light source 52 away from the light entrance portion of the light guide plate 58 and leading light emitted by the LEDs to the light guide plate 58 through the light guides.

While LEDs are used as the light source in the embodiment described above, the present invention is not limited thereto, and a point-like light source including a semiconductor laser (LD) and a xenon lamp may for example be used as well as LEDs.

The embodiments of the first and second aspects may be implemented independently, or two or more embodiments can be appropriately combined to be implemented.

Industrial Applicability

The unitary light guide plate and the light guide plate unit of the present invention are thin and lightweight, emission efficiency of light from the light exit plane with respect to light emitted from the light source can be increased, and a size of the light exit plane of the light guide plate can be increased. Thus, the unitary light guide plate and the light guide plate unit can be thin and lightweight, can emit a uniform illumination light of no brightness unevenness, and can be used for a planar lighting device which can be enlarged.

The light guide plate of the present invention can convert incident light from the point-like light source into planar outgoing light. Thus, the light guide plate is thin and lightweight, can be manufactured at lower costs, can emit uniform illumination light of no brightness unevenness, and can be used for a planar lighting device which can be enlarged.

The planar lighting device of the present invention is thin and lightweight, can emit uniform illumination light of no brightness unevenness, and can be used as a planar lighting device which can be enlarged.

The liquid crystal display device of the present invention is thin and lightweight, can emit uniform illumination light of no brightness unevenness, can be enlarged, and can be used as a liquid crystal display device such as a wall-mounted television.

The invention claimed is:

1. A unitary light guide plate, comprising:
a rectangular flat light exit plane;
a thick portion located substantially on a center portion of the light exit plane in parallel with one side of the light exit plane;
thin end portions formed on both sides of the thick portion in parallel with the thick portion;
a half portion of a parallel groove formed of at least one of the thin end portions and on a backside of the light exit plane to accommodate linearly arranged light sources;

inclined back portions arranged on both sides of the thick portion so as to become thinner from the thick portion to the thin end portions in a direction orthogonal to the one side; and scattering means for scattering light entering from the light sources accommodated in the parallel groove into the thin end portions and propagated through the inclined back portions toward the thick portion.

2. A unitary light guide plate, comprising:

a rectangular flat light exit plane;

a thin portion located substantially on a center portion of the light exit plane in parallel with one side of the light exit plane;

thick end portions formed on both sides of the thin portion in parallel with the thin portion;

a parallel groove formed on a backside of the light exit plane of the thin portion in parallel with the one side to accommodate linearly arranged light sources;

inclined back portions arranged on both sides of the thin portion so as to become thicker from the thin portion to the thick end portions in a direction orthogonal to the one side; and scattering means for scattering light entering from the light sources accommodated in the parallel groove into the thin portion and propagated through the inclined back portions toward the thick end portions.

3. The unitary light guide plate according to claim 1 or 2, wherein the scattering means comprises scattering particles which satisfy Expressions (1) and (2) below:

$$1.1 \leq \Phi \cdot N_P \cdot L_G \cdot K_C \leq 8.2 \quad (1)$$

$$0.005 \leq K_C \leq 0.1 \quad (2)$$

where $\Phi$ represents a scattering cross section of the scattering particles, Np represents a density of the scattering particles contained in the unitary light guide plate, $L_G$ represents a length half of one side of the light exit plane in the direction orthogonal to the parallel groove, and $K_C$ represents a compensation coefficient.

4. The unitary light guide plate according to claim 1 or 2, wherein surface roughness of the light exit plane satisfies Expression (3) below when $Ra_1$ represents surface roughness parallel to the parallel groove, and $Ra_2$ represents surface roughness in a direction perpendicular to the parallel groove:

$$Ra_2 < Ra_1 \text{ and } Ra_2 < 100 \quad (3).$$

5. The unitary light guide plate according to claim 1 or 2, wherein an angle formed when a plane parallel to the light exit plane and an inclined plane of each of the inclined back portions cross each other at a vertex of the thick portion or each of the thick end portions satisfies Expression (4) below:

$$0° < \alpha < 45° \quad (4)$$

where $\alpha$ represents an angle formed when the plane parallel to the light exit plane and the inclined plane of each of the inclined back portions cross each other at the thick portion or each of the thick end portions).

6. A light guide plate unit, comprising two or more of the unitary light guide plates according to claim 1, which are coupled together in such a way that respective light exit planes are arranged to form a same plane, wherein, in the two unitary light guide plates adjacent to each other, half portions of parallel grooves of thin end portions are coupled together in a direction orthogonal to at least the one side to form the parallel grooves for accommodating the linearly arranged light sources.

7. The light guide plate unit according to claim 6, wherein two or more sets of coupled bodies each of which comprises the two or more of the unitary guide plates coupled in the direction orthogonal to the one side are coupled together in a direction parallel to the parallel grooves so that the parallel grooves are arrayed on a same line.

8. A light guide plate unit, comprising:

two or more of the unitary light guide plates according to claim 2, which are coupled together in such a way that respective light exit planes are arranged to form a same plane, wherein, the two unitary light guide plates adjacent to each other are coupled together in a direction orthogonal to parallel grooves by coupling thick end portions together, a direction parallel to the parallel grooves so that the parallel grooves are arrayed on a same line, or both of the direction parallel to the parallel grooves and the direction orthogonal to the parallel grooves.

9. A light guide plate unit, further comprising two half portions of a unitary light guide plate, each comprising: a rectangular flat light exit plane; a thin end portion on one end side of the light exit plane; a thick end portion on another end side thereof; an inclined back portion formed so as to become thicker from the thin end portion to the thick portion; and scattering means for scattering light entering from the light source into the thin end portion and propagated through the inclined back portion toward the thick end portion, wherein respective thick end portions of the two half portions of the unitary light guide plate are coupled to the thick end portions of both ends of the unitary light guide plate according to claim 2 or uncoupled thick end portions of the unitary light guide plate, which are arranged at both ends in a direction orthogonal to the one side of the light guide plate unit in such a way that respective light exit planes are arranged to form a same plane.

10. A planar lighting device, comprising:

the light guide plate unit according to claim 6; and light sources linearly arranged in the parallel grooves, respectively, each being formed in coupled portion of the thin end portions of the unitary light guide plates of the light guide plate unit, which are adjacent to each other.

11. The planar lighting device according to claim 10, wherein the light sources are also arranged linearly in the uncoupled thin end portions of the light guide plate unit, which are arranged in both ends in a direction orthogonal to the one side of the light guide plate unit.

12. A planar lighting device, comprising:

the light guide plate unit according to claim 8; and light sources linearly arranged in the parallel groove of each unitary light guide plate of the light guide plate unit.

13. The planar lighting device according to claim 12, wherein the light sources are also arranged linearly in the uncoupled thin end portions of the half portions of the unitary light guide plates when the half portions of the unitary light guide plates are coupled to both ends in a direction orthogonal to the one side in the light guide plate unit.

14. The planar lighting device according to claim 10 or 12, wherein the light sources comprise linear light sources or point-like light sources linearly arranged at predetermined intervals.

15. The planar lighting device according to claim 10 or 12, wherein a light exit distribution of the light sources disposed in the parallel groove is larger in a wall direction of both sides of the parallel groove than in a ceiling direction thereof.

16. The planar lighting device according to claim 10 or 12, wherein a relationship between a maximum thickness of the unitary light guide plate in a direction perpendicular to the light exit plane and a distance between the light sources satisfies Expression (5) below:

$$10T < D_1 < 1000T \quad (5)$$

where T represents the maximum thickness of the unitary guide plate, and $D_1$ represents the distance between the light sources.

17. The planar lighting device according to claim 10 or 12 wherein a distance between the linearly arranged light sources satisfies Expression (6) below:

$$10 \text{ mm} < D_2 \quad (6)$$

where $D_2$ represents the distance between the linearly arranged light sources.

18. The planar lighting device according to claim 10 or 12, further comprising a reflection film disposed on a backside of an inclined plane of the inclined back portion of the light guide plate unit.

19. The planar lighting device according to claim 10 or 12, further comprising a diffusion sheet disposed on the light exit plane of the light guide plate unit.

20. The planar lighting device according to claim 10 or 12, further comprising a prism sheet disposed between the light exit plane and the diffusion sheet of the light guide plate unit.

21. A unitary light guide plate made of a transparent resin for converting incident light from a point-like light source into planar exiting light, which has a plate-like shape, comprising:
a light exit plane for emitting the planar exiting light to an outside thereof;
a backside facing the light exit plane;
a lateral plane connected to the light exit plane and the backside;
a light entrance portion disposed substantially in a center portion of the backside and formed as a concave portion for disposing the point-like light source and causing the incident light from the point-like light source to enter to an inside thereof; and
scattering means for scattering light entering from the light entrance portion to the inside thereof and emitting the light from the light exit plane to the outside thereof,
wherein a thickness defined as a distance between the light exit plane and the backside becomes lager with an increasing distance from the light entrance portion.

22. The unitary light guide plate according to claim 21, wherein the scattering means comprises scattering particles contained in the unitary light guide plate, and satisfies Expressions (7) and (8) below:

$$1.1 \leq \Phi \cdot N_P \cdot L \cdot K_C \leq 8.2 \quad (7)$$

$$0.005 \leq K_C \leq 0.1 \quad (8)$$

where $\Phi$ represents a scattering cross section of the scattering particles, L represents a distance from the light entrance portion to a position in which a thickness of the unitary light guide plate is the maximum, Np represents a density of the scattering particles, and $K_C$ represents a compensation coefficient.

23. A planar lighting device, comprising:
a point-like light source; and
the unitary light guide plate according to claim 21 or 22.

24. The planar lighting device according to claim 23, wherein the unitary light guide plate satisfies Expression (9) below, when $D_1$ represents a thickness of the unitary light guide plate in an abyss of the concave portion of the light entrance portion, $D_2$ represents a thickness of the unitary light guide plate in a position in which the thickness of the unitary light guide plate is the maximum, and L represents a distance from the light entrance portion to the position in which the thickness of the unitary light guide plate is the maximum:

$$D_1 < D_2, \text{ and } 1/1{,}000 < (D_2 - D_1)/L < L/10 \quad (9).$$

25. The planar lighting device according to claim 23, comprising two or more of the unitary light guide plates,
wherein the lateral plane of the unitary light guide plate and the lateral plane of another unitary light guide plate are arranged adjacently to each other.

26. The planar lighting device according to claim 23, wherein the unitary light guide plate has a regular-polygonal plate-like shape and/or a circular plate-like shape.

27. The planar lighting device according to claim 23 wherein the unitary light guide plate has a hexagon plate-like shape.

28. The planar lighting device according to claim 23, wherein the unitary light guide plate includes the flat light exit plane and the backside inclined with respect to the light exit plane.

29. The planar lighting device according to claim 23, wherein the unitary light guide plate includes the flat backside, and the light exit plane inclined with respect to the backside.

30. The planar lighting device according to claim 23, wherein the unitary light guide plate has a shape in which the backside and the light exit plane are both inclined, and a thickness becomes larger with an increasing distance from the light entrance portion.

31. The planar lighting device according to claim 23, further comprising a reflection film disposed to face the backside of the unitary light guide plate.

32. The planar lighting device according to claim 23, wherein the unitary light guide plate is formed by mixing at least a plasticizer in a transparent resin.

33. The planar lighting device according to claim 23, wherein the point-like light source comprises a white LED.

34. The planar lighting device according to claim 23, wherein the point-like light source is configured by using an RGB-LED including a red light emitting diode, a green light emitting diode, and a blue light emitting diode, and a plurality of lenses arranged correspondingly to light exist sides of the red light emitting diode, the green light emitting diode, and the blue light emitting diode.

35. The planar lighting device according to claim 34, wherein each of the plurality of lenses comprises a spherical transparent ball lens.

36. The planar lighting device according to claim 23, wherein the unitary light guide plate includes a plurality of diffusion reflectors in at least one of the light exit plane, the backside, and the lateral plane.

37. The planar lighting device according to claim 36, wherein the plurality of diffusion reflectors are arranged more densely with an increasing distance from the light entrance portion.

38. The planar lighting device according to claim 36, wherein the plurality of diffusion reflectors are arranged on the backside.

39. A liquid crystal display device, comprising:
the planar lighting device according to claim 23;
a liquid crystal display panel disposed on a light exit plane side of the unitary light guide plate of the planar lighting device; and
a drive unit for driving the liquid crystal display panel

* * * * *